(12) United States Patent
Si et al.

(10) Patent No.: US 10,547,366 B2
(45) Date of Patent: Jan. 28, 2020

(54) METHOD AND APPARATUS FOR CSI REPORTING ON PUCCH

(71) Applicant: Samsung Electronics Co., Ltd, Suwon-si (KR)

(72) Inventors: Hongbo Si, Garland, TX (US); Eko Onggosanusi, Allen, TX (US); Aris Papasakellariou, Houston, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/242,428

(22) Filed: Aug. 19, 2016

(65) Prior Publication Data

US 2017/0070277 A1 Mar. 9, 2017

Related U.S. Application Data

(60) Provisional application No. 62/341,381, filed on May 25, 2016, provisional application No. 62/311,074, (Continued)

(51) Int. Cl.
*H04B 7/06* (2006.01)
*H04B 7/04* (2017.01)
(Continued)

(52) U.S. Cl.
CPC ......... *H04B 7/0626* (2013.01); *H04B 7/0413* (2013.01); *H04B 7/0456* (2013.01); (Continued)

(58) Field of Classification Search
CPC .. H04B 7/0626; H04B 7/0469; H04B 7/0456; H04B 7/0413; H04B 7/0632; H04B 7/063; H04B 7/0639; H04W 72/0413
See application file for complete search history.

(56) References Cited

U.S. PATENT DOCUMENTS

2013/0121270 A1* 5/2013 Chen ................... H04L 5/001
370/329
2013/0156001 A1* 6/2013 Gomadam ........ H04W 72/0406
370/330
(Continued)

OTHER PUBLICATIONS

Qualcomm Incorporated, Remaining issues of eMIMO CSI feedback, 3GPP TSG-RAN WG1 #73 , May 20-24, 2013, Fukuoka, Japan, R1-132485.*
(Continued)

*Primary Examiner* — Shailendra Kumar

(57) ABSTRACT

A method of a user equipment (UE) for channel state information (CSI) reporting in a wireless communication system. The method comprises receiving CSI reporting configuration information, generating a CSI report comprising at least one of a rank indicator (RI), a channel quality indicator (CQI), a precoding matrix indicator (PMI), or a CSI-RS resource indicator (CRI) based on the CSI reporting configuration information, determining a number of bits of a payload included in the CSI report, and selecting at least one of a physical uplink control channel (PUCCH) Format or a physical uplink shared channel (PUSCH) based on the number of bits of the payload included in the CSI report to transmit the CSI report.

19 Claims, 17 Drawing Sheets

Related U.S. Application Data filed on Mar. 21, 2016, provisional application No. 62/248,618, filed on Oct. 30, 2015, provisional application No. 62/241,981, filed on Oct. 15, 2015, provisional application No. 62/214,319, filed on Sep. 4, 2015.

(51) Int. Cl.
*H04W 72/04* (2009.01)
*H04B 7/0456* (2017.01)
*H04B 7/0413* (2017.01)

(52) U.S. Cl.
CPC ...... *H04B 7/0469* (2013.01); *H04W 72/0413* (2013.01); *H04B 7/063* (2013.01); *H04B 7/0632* (2013.01); *H04B 7/0639* (2013.01)

(56) References Cited

U.S. PATENT DOCUMENTS

| | | | | |
|---|---|---|---|---|
| 2014/0036704 | A1* | 2/2014 | Han | H04W 28/12 370/252 |
| 2014/0071928 | A1 | 3/2014 | Papasakellariou et al. | |
| 2015/0071202 | A1* | 3/2015 | Liu | H04L 5/0057 370/329 |
| 2016/0094284 | A1* | 3/2016 | Yum | H04B 7/0456 375/267 |
| 2017/0188350 | A1* | 6/2017 | Kim | H04B 17/309 |
| 2017/0310441 | A1* | 10/2017 | Wei | H04B 7/0639 |
| 2018/0248607 | A1* | 8/2018 | Park | H04B 7/06 |
| 2019/0089423 | A1* | 3/2019 | Davydov | H04B 7/0417 |
| 2019/0097693 | A1* | 3/2019 | Park | H04L 5/0053 |

OTHER PUBLICATIONS

3GPP, LTE; Evolved Universal Terrestrial Radio Access (E-UTRA); Physical layer procedures, Oct. 2014, 3GPP TS 36.213 version 12.3.0 Release 12.*
LG Electronics, Periodic CSI feedback enhancement for Rel-13 CA, 3GPP TSG RAN WG1 Meeting #82, Beijing, China, Aug. 24-28, 2015, R1-154248. (Year: 2015).*
3GPP TS 36.211 V12.4.0 (Dec. 2014) 3rd Generation Partnership Project;Technical Specification Group Radio Access Network; Evolved Universal Terrestrial Radio Access (E-UTRA); Physical channels and modulation(Release 12) 124 Pages.
3GPP TS 36.211 V13.0.0 (Dec. 2015) 3rd Generation Partnership Project;Technical Specification Group Radio Access Network; Evolved Universal Terrestrial Radio Access (E-UTRA); Physical channels and modulation (Release 13) 141 Pages.
3GPP TS 36.212 V12.3.0 (Dec. 2014) 3rd Generation Partnership Project;Technical Specification Group Radio Access Network; Evolved Universal Terrestrial Radio Access (E-UTRA); Multiplexing and channel coding (Release 12) 89 Pages.
3GPP TS 36.212 V13.0.0 (Dec. 2015) Technical Specification 3rd Generation Partnership Project; ss Network; Evolved Universal Terrestrial Radio Access (E-UTRA); Multiplexing and channel coding 121 Pages.
3GPP TS 36.213 V12.4.0 (Dec. 2014) 3rd Generation Partnership Project;Technical Specification Group Radio Access Network; Evolved Universal Terrestrial Radio Access (E-UTRA); Physical layer procedures(Release 12)—225 Pages.
3GPP TS 36.213 V13.0.0 (Dec. 2015) Technical Specification3rd Generation Partnership Project; Technical Specification Group Radio Access Network;Evolved Universal Terrestrial Radio Access (E-UTRA);Physical layer procedures (Release 13) 326 Pages.
3GPP TS 36.321 V12.4.0 (Dec. 2014) 3rd Generation Partnership Project; Technical Specification Group Radio Access Network; Evolved Universal Terrestrial Radio Access (E-UTRA);Medium Access Copntrol (MAC) protocol specification (Release 12) 60 Pages.
3GPP TS 36.321 V13.0.0 (Dec. 2015) 3rd Generation Partnership Project; Technical Specification Group Radio Access Network; Evolved Universal Terrestrial Radio Access (E-UTRA); Medium Access Control (MAC) protocol specification (Release 13) 82 Pages.
3GPP TS 36.321 V13.0.0 (Dec. 2015) 3rd Generation Partnership Project; Technical Specification Group Radio Access Network; Evolved Universal Terrestrial Radio Access (E-UTRA); Radio Resource Control (RRC) (Release 12) 410 Pages.
3GPP TS 36.331 V13.0.0 (Dec. 2015) 3rd Generation Partnership Project; Technical Specification Group Radio Access Network; Evolved Universal Terrestrial Radio Access (E-UTRA); Radio Resource Control (RRC); Protocol specification (Release 13) 507 Pages.
3GPP TSG RAN Meeting #71 RP-160623 New WID Proposal: Enhancements on Full-Dimension (FD) MIMO for LTE New WID Proposal: Enhancements on Full-Dimension (FD) MIMO for LTE Göteborg, Sweden, Mar. 7-10, 2016, 8 Pages.
International Search Report dated Dec. 2, 2016 in connection with International Application No. PCT/KR2016/009858, 3 pages.
Written Opinion of the International Searching Authority dated Dec. 2, 2016 in connection with International Application No. PCT/KR2016/009858, 8 pages.
Huawei, et al., "Dynamic Adaptation of PUCCH Formats with HARQ-ACK Feedback for Carrier Aggregation Enhancement Beyond 5 Carriers", 3GPP TSG RAN WG1 Meeting #82, R1-153772, Beijing, China, Aug. 24-28, 2015, 3 pages.
Huawei, et al., "New PUCCH Format Design to Support UCI Transmission for Up to 32 Component Carriers", 3GPP TSG RAN WG1 Meeting #82, R1-153770, Beijing, China, Aug. 24-28, 2015, 3 pages.
Supplementary European Search Report dated Jul. 19, 2018 in connection with European Patent Application No. 16 84 2360, 9 pages.
LG Electronics, "Periodic CSI feedback enhancement for Rel-13 CA", 3GPP TSG RAN WG1 Meeting #82, Aug. 24-28, 2015, 3 pages, R1-154248.
Communication pursuant to Article 94(3) EPC dated Mar. 13, 2019 in connection with European Patent Application No. 16 842 360.6, 5 pages.

* cited by examiner

| Number of ports 1805 | Port layouts, and ($N_1$,$N_2$) values 1810 | | | |
|---|---|---|---|---|
| 20 | (5,2) ××××× ××××× <br><br> (10,1) ×××××××××× | (2,5) ×× ×× ×× ×× ×× | (1,10) × × × × × × × × × × | |
| 24 | (4,3) ×××× ×××× ×××× <br><br> (6,2) ×××××× ×××××× <br><br> (12,1) ×××××××××××× | (3,4) ××× ××× ××× ××× | (2,6) ×× ×× ×× ×× ×× ×× | (1,12) × × × × × × × × × × × × |
| 28 | (7,2) ××××××× ××××××× <br><br> (14,1) ×××××××××××××× | (2,7) ×× ×× ×× ×× ×× ×× ×× | (1,14) × × × × × × × × × × × × × × | |
| 32 | (4,4) ×××× ×××× ×××× ×××× <br><br> (8,2) ×××××××× ×××××××× <br><br> (16,1) ×××××××××××××××× | (2,8) ×× ×× ×× ×× ×× ×× ×× ×× | (1,16) × × × × × × × × × × × × × × × × | |

1800

2nd dim ↑ → 1st dim

FIGURE 18

METHOD AND APPARATUS FOR CSI REPORTING ON PUCCH

CROSS-REFERENCE TO RELATED APPLICATIONS AND CLAIM OF PRIORITY

The present application claims priority to U.S. Provisional Patent Application Ser. No. 62/214,319, filed on Sep. 4, 2015, entitled "Method and Apparatus for CSI Reporting on PUCCH;" U.S. Provisional Patent Application Ser. No. 62/241,981, filed on Oct. 15, 2015, entitled "Method and Apparatus for CSI Reporting on PUCCH;" U.S. Provisional Patent Application Ser. No. 62/248,618, filed on Oct. 30, 2015, entitled "Method and Apparatus for CSI Reporting on PUCCH;" U.S. Provisional Patent Application Ser. No. 62/311,074, filed on Mar. 21, 2016, entitled "Method and Apparatus for Channel State Information Reporting on PUCCH;" and U.S. Provisional Patent Application Ser. No. 62/341,381, filed on May 25, 2016, entitled "Method and Apparatus for CSI Reporting on PUCCH." The content of the above-identified patent documents are incorporated herein by reference.

TECHNICAL FIELD

The present application relates generally to uplink reporting operation in wireless communication systems. More specifically, this disclosure relates to an efficient channel state information (CSI) reporting on a physical uplink control channel (PUCCH).

BACKGROUND

Understanding and correctly estimating the channel in an advance wireless communication system between a user equipment (UE) and an eNode B (eNB) is important for efficient and effective wireless communication. In order to correctly estimate the channel conditions, the UE will report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-$5^{th}$-Generation (5G) or 5G communication system to be provided for supporting higher data rates Beyond $4^{th}$-Generation (4G) communication system such as Long Term Evolution (LTE). Embodiments of the present disclosure provide an efficient CSI reporting on PUCCH in an advanced wireless communication system.

In one embodiment, a user equipment (UE) for channel state information (CSI) reporting in a wireless communication system is provided. The UE includes a transceiver configured to receive CSI reporting configuration information. The UE further includes at least one processor operably connected to the transceiver, the at least one processor configured to generate a CSI report comprising at least one of a rank indicator (RI), a channel quality indicator (CQI), a precoding matrix indicator (PMI), or a CSI-RS resource indicator (CRI) based on the CSI reporting configuration information, determine a number of bits of a payload included in the CSI report, and select at least one of a physical uplink control channel (PUCCH) Format or a physical uplink shared channel (PUSCH) based on the number of bits of the payload included in the CSI report to transmit the CSI report.

In another embodiment, an eNodeB (eNB) for channel state information (CSI) reporting in a wireless communication system is provided. The eNB includes a transceiver configured to transmit CSI reporting configuration information and receive at least one of a PUCCH Format or a physical uplink shared channel (PUSCH) including a CSI report that includes at least one of a rank indicator (RI), a channel quality indicator (CQI), a precoding matrix indicator (PMI), or a CSI resource indicator (CRI) based on the CSI reporting configuration information, wherein the PUCCH Format is determined based on a number of bits of a payload included in the CSI report. The eNB further includes at least one processor operably connected to the transceiver, the at least one processor configured to determine a number of bits of a payload included in the CSI report and select at least one of a physical uplink control channel (PUCCH) Format or a physical uplink shared channel (PUSCH) based on the number of bits of the payload included in the CSI report to receive the CSI report.

In yet another embodiment, a method of a user equipment (UE) for channel state information (CSI) reporting in a wireless communication system is provided. The method comprises receiving CSI reporting configuration information, generating a CSI report comprising at least one of a rank indicator (RI), a channel quality indicator (CQI), a precoding matrix indicator (PMI), or a CSI-RS resource indicator (CRI) based on the CSI reporting configuration information, determining a number of bits of a payload included in the CSI report, and selecting at least one of a physical uplink control channel (PUCCH) Format or a physical uplink shared channel (PUSCH) based on the number of bits of the payload included in the CSI report to transmit the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates an example dual-polarized antenna port layout according to embodiments of the present disclosure;

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v12.4.0, "E-UTRA, Physical channels and modulation" (REF1); 3GPP TS 36.212 v12.3.0, "E-UTRA, Multiplexing and Channel coding" (REF2); 3GPP TS 36.213 v12.4.0, "E-UTRA, Physical Layer Procedures" (REF3); 3GPP TS 36.321 v12.4.0, "E-UTRA, Medium Access Control (MAC) protocol specification" (REF4); 3GPP TS 36.331 v12.4.0, "E-UTRA, Radio Resource Control (RRC) protocol specification" (REF5); and RP-160623, "New WID Proposal: Enhancements on Full-Dimension (FD) MIMO for LTE."

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
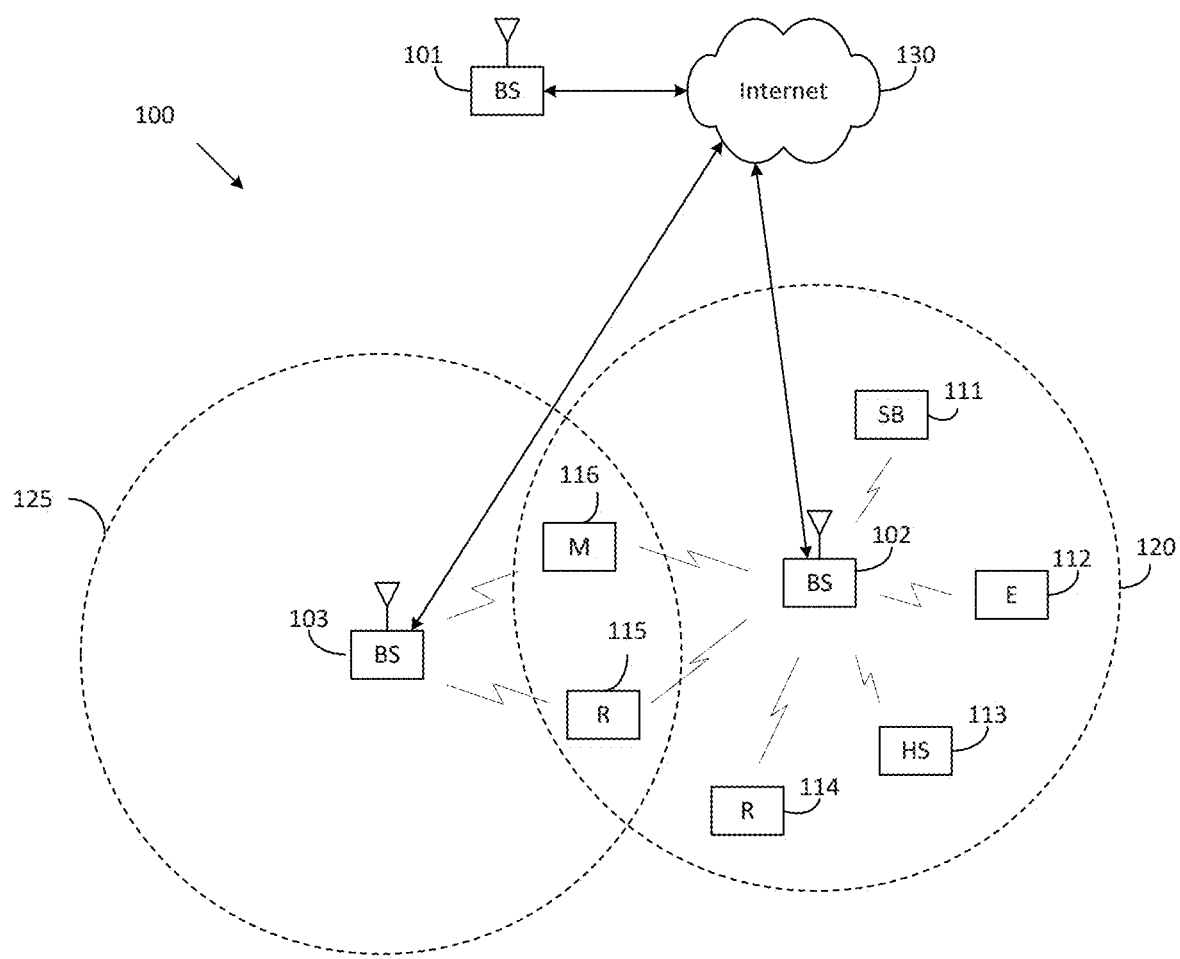
FIG. 1 illustrates an example wireless network according to embodiments of the present disclosure.
Figure 2:
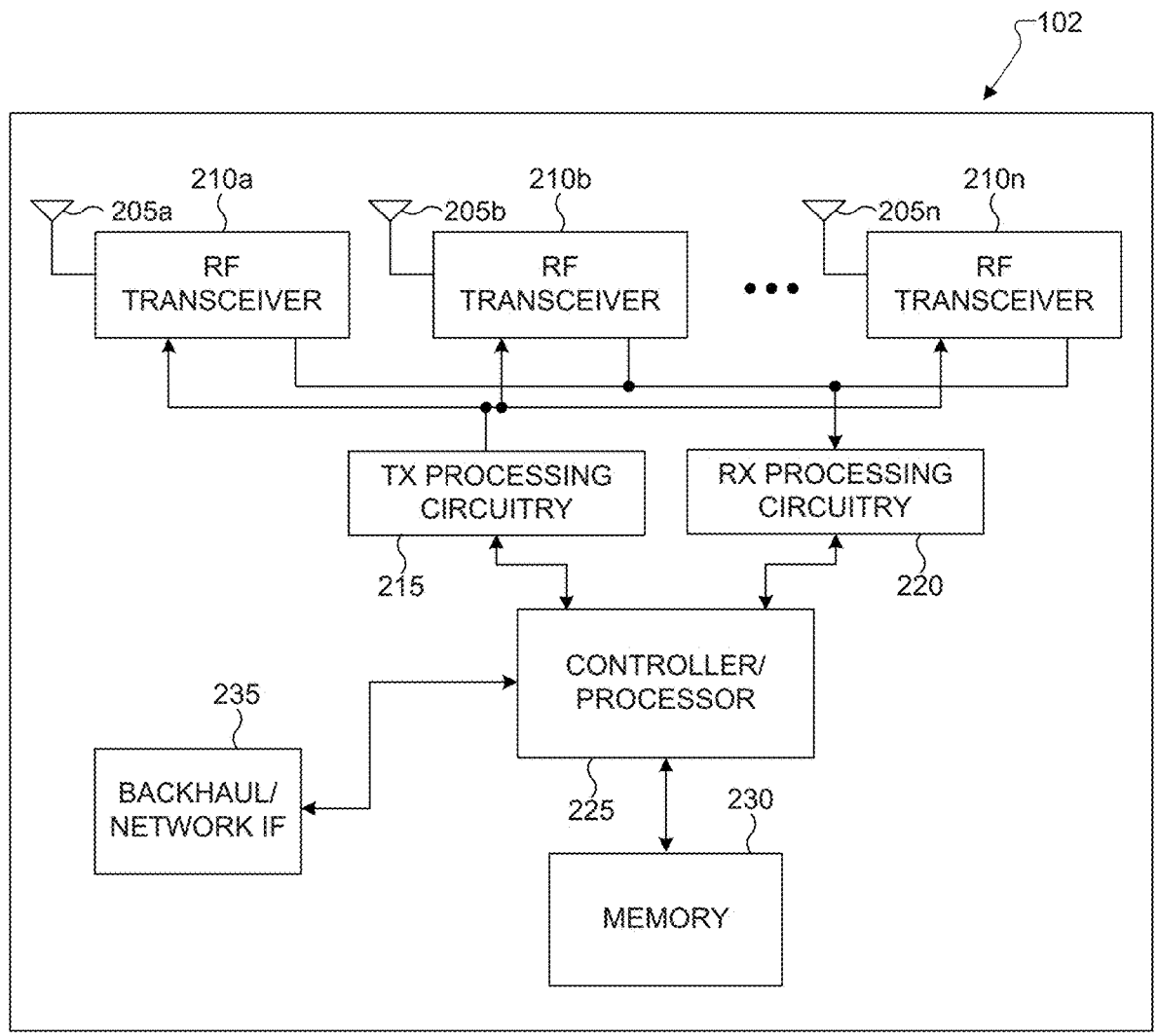
FIG. 2 illustrates an example eNB according to embodiments of the present disclosure.
Figure 3:
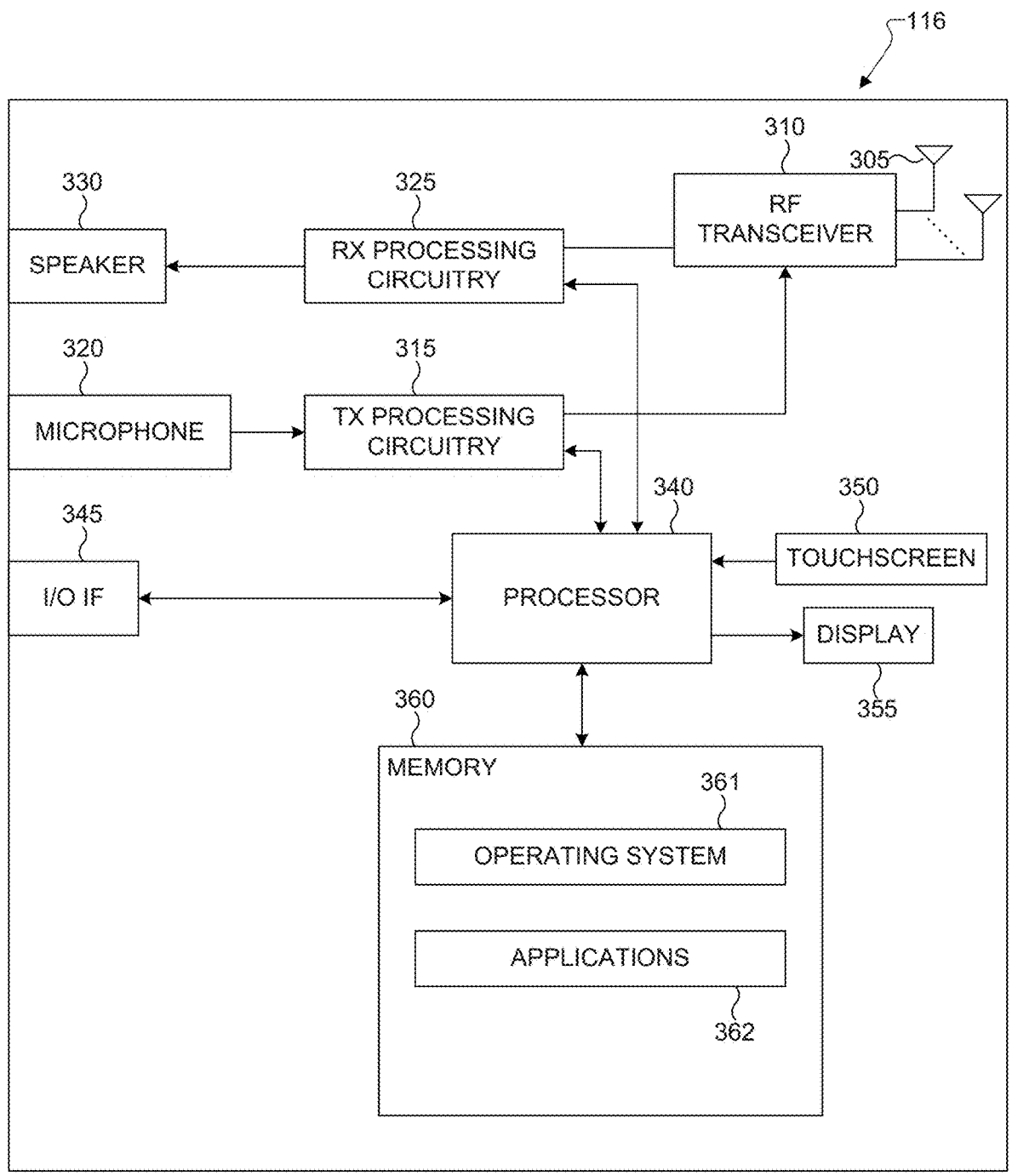
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of transmitting CSI reporting configuration information and receive at least one of a PUCCH Format or a physical uplink shared channel (PUSCH) including a CSI report that includes at least one of a rank indicator (RI), a channel quality indicator (CQI), a precoding matrix indicator (PMI), or a CSI resource indicator (CRI) based on the CSI reporting configuration information, wherein the PUCCH Format is determined based on a number of bits of a payload included in the CSI report.

In some embodiments, the RF transceiver 210a-201n is also capable of receiving the CSI report using a PUCCH Format 2. In some embodiments, the RF transceiver 210a-201n is also capable of receiving an uplink transmission including the CSI report over the PUSCH.

In some embodiments, the RF transceiver 210a-201n is also capable of receiving a PUCCH Format 1 comprising the CSI report that includes the CRI, if the number of bits of the payload included in the CRI is smaller than or equal to a two bit and receiving a PUCCH Format 2 comprising the CSI report that includes the CRI, if the number of bits of the payload included in the CRI is greater than the two bit.

In some embodiments, the RF transceiver 210a-201n is also capable of receiving the PUCCH Format corresponding to at least one of a first CSI reporting mode comprising a Class A enhanced multi-input multi-output (eMIMO)-Type or a second CSI reporting mode comprising a Class B eMIMO-Type. In some embodiments, the RF transceiver 210a-201n is further configured to receive the first subset associated with the first eMIMO-Type and the second subset associated with the second eMIMO-Type using either a same PUCCH Format including a PUCCH Format 2 or PUCCH Format 3, or a different PUCCH Format including the PUCCH Format 2 or the PUCCH Format 3.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is also capable of determining a number of bits of a payload included in the CSI report and selecting at least one of a physical uplink control channel (PUCCH) Format or a physical uplink shared channel (PUSCH) based on the number of bits of the payload included in the CSI report to receive the CSI report.

In some embodiments, the controller/processor 225 is capable of selecting a PUCCH Format 2 comprising the number of bits, if the number of bits of the payload is smaller than or equal to an allowable number of bits of the CSI report included in the PUCCH Format 2, the CSI report comprising at least one of the RI, the CQI, the PMI, or the CRI.

In some embodiments, the controller/processor 225 is capable of determining the uplink transmission including the number of bits of the payload over the PUSCH, if the number of bits of the payload is greater than an allowable number of bits of the CSI report included in a PUCCH Format 3, the CSI report comprising at least one of the RI, the CQI, the PMI, or the CRI.

In some embodiments, the controller/processor 225 is capable of determining the number of bits of the payload included in the CRI and determining the CSI report including the CRI. In some embodiments, the controller/processor 225 is capable of determining a hybrid CSI report comprising the first CSI reporting mode and the second CSI reporting mode and determining the CSI report comprising a first subset and a second subset included in a CSI report set based on a number of bits of a payload included in the CSI report, the first subset mapping into the first CSI reporting mode and the second subset mapping into the second CSI reporting mode.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving CSI reporting configuration information. In some embodiments, the RF transceiver 310 is capable of the transceiver is further configured to transmit the CSI report using the PUCCH Format 2. In some embodiments, the RF transceiver 310 is capable of transmitting the CSI report using the PUCCH Format 3. In some embodiments, the RF transceiver 310 is capable of the transceiver is further configure to transmit the uplink transmission including the CSI report over the PUSCH.

In some embodiments, the RF transceiver 310 is capable of transmitting a PUCCH Format 1 comprising the CSI report that includes the CRI, if the number of bits of the payload included in the CRI is smaller than or equal to a two bit and transmitting a PUCCH Format 2 comprising the CSI report that includes the CRI, if the number of bits of the payload included in the CRI is greater than the two bit. In some embodiments, the RF transceiver 310 is capable of transmitting at least one of the PUCCH format or the PUSCH including at least one of the first subset or the second subset included in the CSI report set, wherein each of the first subset and the second subset included in the CSI report set comprises different CSI reports in accordance with the number of bits of the payload included in the CSI report, wherein each of the first subset and the second subset included in the CSI report set is transmitted over different subframes, each of the different subframes comprising at least one subframe.

In some embodiments, the RF transceiver 310 is capable of transmitting the PUCCH Format corresponding to at least one of the first CSI reporting mode or the second CSI reporting mode, wherein the first CSI reporting mode comprises a Class A enhanced multi-input multi-output (eMIMO)-Type and the second CSI reporting mode comprises a Class B eMIMO-Type. In some embodiments, the RF transceiver 310 is further configured to report the first subset associated with the first eMIMO-Type and the second subset associated with the second eMIMO-Type using at least one of a PUCCH Format 2 or a PUCCH Format 3.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of generating a CSI report comprising at least one of a rank indicator (RI), a channel quality indicator (CQI), a precoding matrix indicator (PMI), or a CSI-RS resource indicator (CRI) based on the CSI reporting configuration information, determining a number of bits of a payload included in the CSI report, and selecting at least one of a physical uplink control channel (PUCCH) Format or a physical uplink shared channel (PUSCH) based on the number of bits of the payload included in the CSI report to transmit the CSI report.

In some embodiments, the processor 340 is also capable of selecting a PUCCH Format 2 comprising the number of bits of the payload, if the number of bits of the payload is smaller than or equal to an allowable number of bits of the CSI report included in the PUCCH Format 2, the CSI report comprising at least one of the RI, the CQI, the PMI, or the CRI.

In some embodiments, the processor 340 is also capable of selecting a PUCCH Format 3 comprising the number of bits of the payload, if the number of bits of the payload is greater than an allowable number of bits of the CSI report included in the PUCCH Format 2 and smaller than or equal to an allowable bits of the CSI report included in the PUCCH Format 3, the CSI report comprising at least one of the RI, the CQI, the PMI, or the CRI.

In some embodiments, the processor 340 is also capable of determining an uplink transmission including the number of bits of the payload over the PUSCH, if the number of bits of the payload is greater than an allowable number of bits of the CSI report included in a PUCCH Format 3, the CSI report comprising at least one of the RI, the CQI, the PMI, or the CRI.

In some embodiments, the processor 340 is also capable of determining the number of bits of the payload included in the CRI and determining the CSI report including the CRI. In some embodiments, the processor 340 is also capable of determining a CSI report set comprising a first subset and a second subset based on the CSI reporting configuration information that is used for the CSI report, determining the number of bits of the payload included in the CSI report for the first subset and the second subset included in the CSI report set, and determining at least one of the PUCCH format or the PUSCH for the first subset and the second subset based on the number of bits of the payload included in the CSI report, wherein each of the first subset and the second subset included in the CSI report set comprises different CSI reports in accordance with the number of bits of the payload included in the CSI report, wherein each of the first subset and the second subset included in the CSI report set is transmitted over different subframes, each of the different subframes comprising at least one subframe. In some embodiments, each of the first subset and the second subset included in the CSI report set is configured to be reported using either a same PUCCH Format including at least one of a PUCCH Format 2 or PUCCH Format 3, or a different PUCCH Format including at least one of the PUCCH Format 2 or the PUCCH Format In some embodiments, the processor 340 is also capable of determining a hybrid CSI report comprising a first CSI reporting mode and a second CSI reporting mode, determining the CSI report comprising a first subset and a second subset included in a CSI report set based on the number of bits of the payload included in the CSI report, and mapping the first subset into the first CSI reporting mode and the second subset into the second CSI reporting mode, wherein the first CSI reporting mode comprises a Class A enhanced multi-input multi-output (eMIMO)-Type and the second CSI reporting mode comprises a Class B eMIMO-Type.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
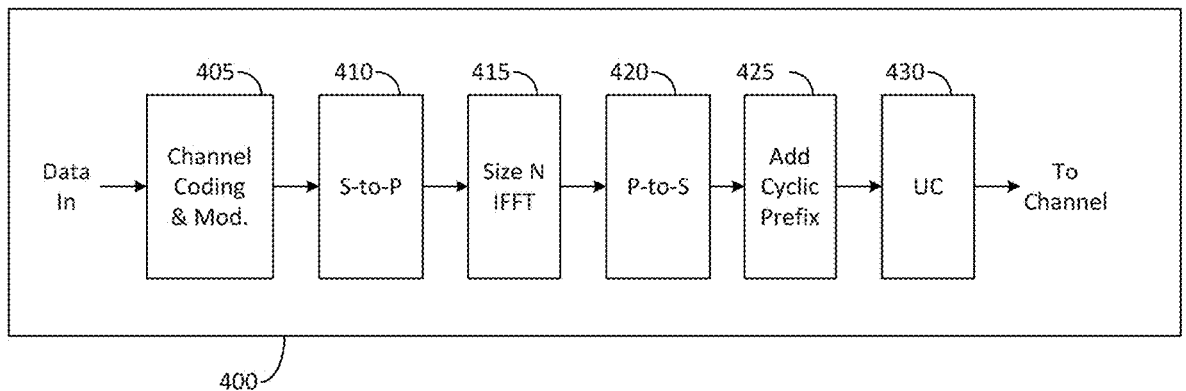
FIG. 4A illustrates a high-level diagram of an orthogonal frequency division multiple access transmit path according to embodiments of the present disclosure.
Figure 4B:
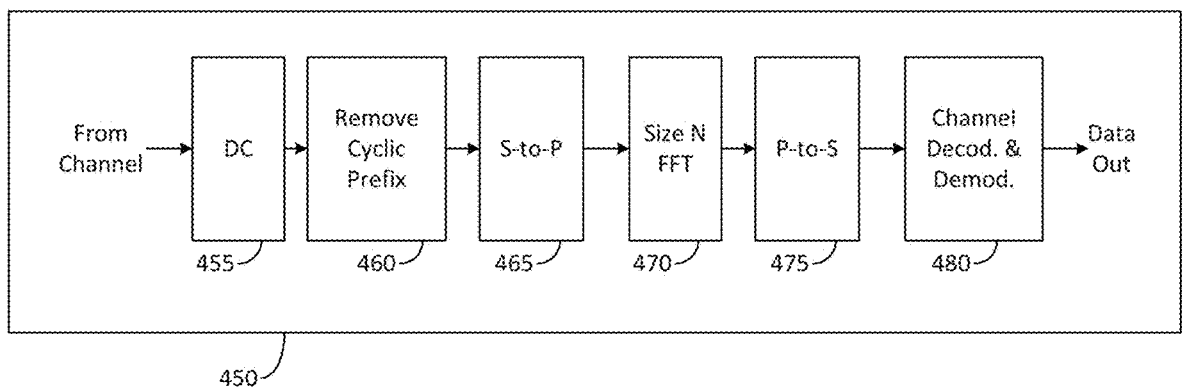
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel. 12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basis functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
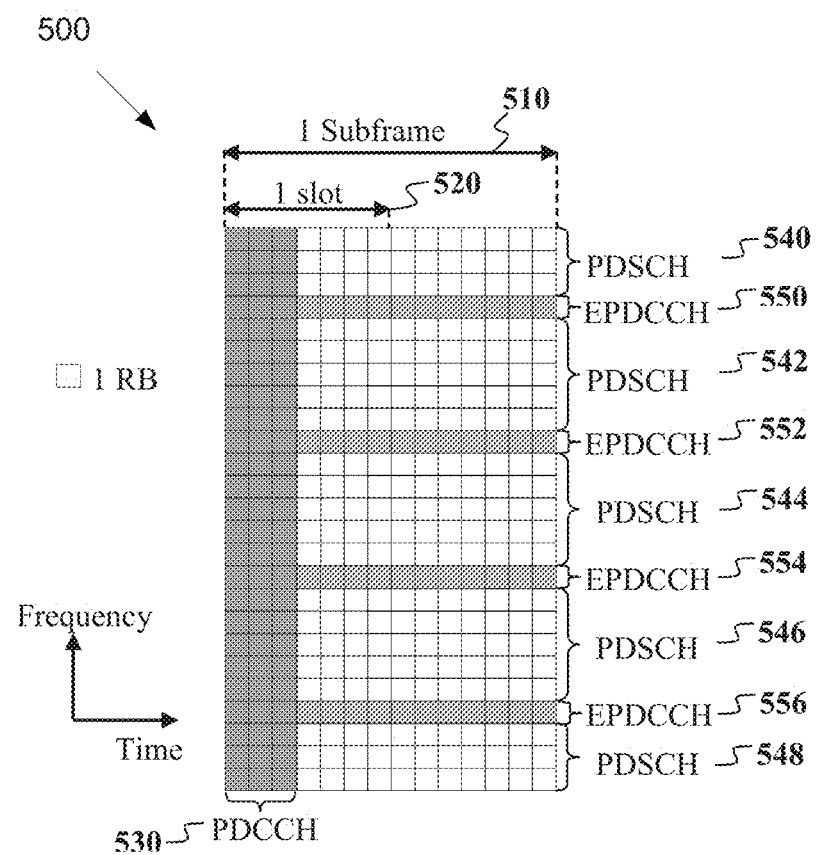
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCH}$ RBs for a total of $Z=O_F+\lfloor(n_{s0}+y \cdot N_{EPDCCH})/D\rfloor$ REs for a PDSCH transmission BW. An EPDCCH transmission is achieved in either one RB or multiple of RBs.

Figure 6:
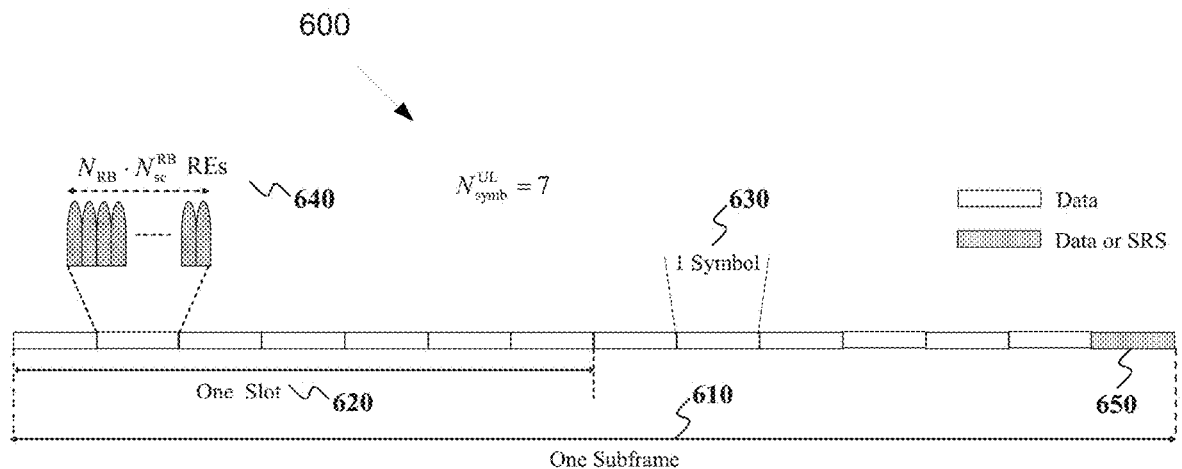
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 7:
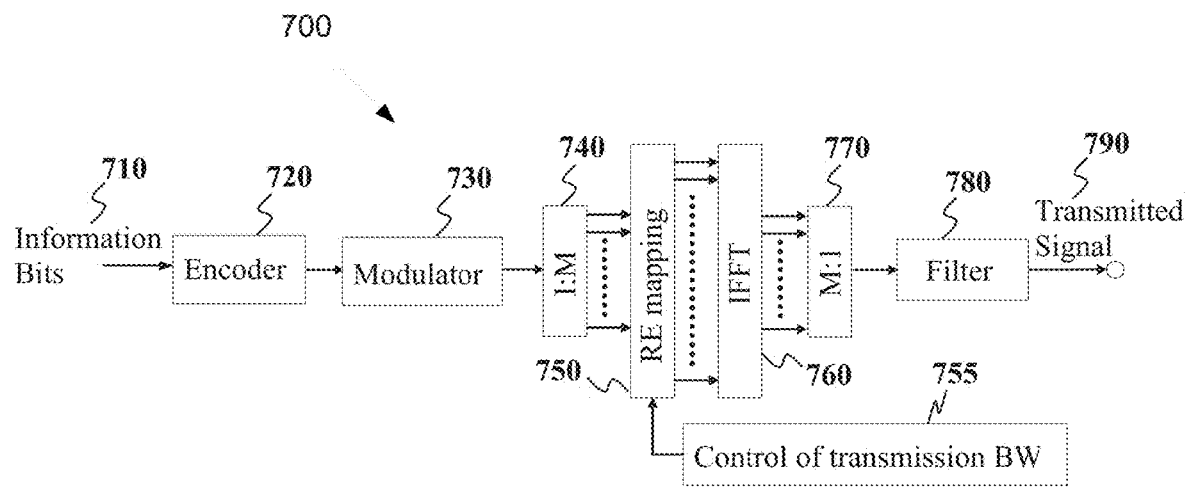
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
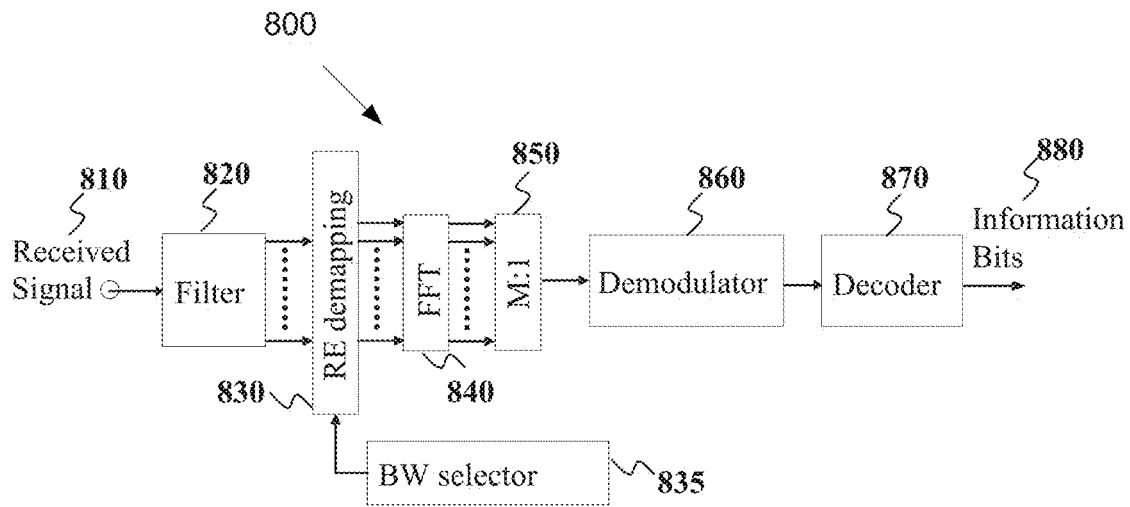
FIG. 8 illustrates an example receiver block diagram for a PDSCH subframe according to embodiments of the present disclosure.

FIG. 8 illustrates an example receiver block diagram for a packet data shared channel (PDSCH) subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping 830 assigns a reception bandwidth (BW) that is selected by a BW selector 835. The BW selector 835 is configured to control a transmission BW. A fast Fourier transform (FFT) circuit 840 applies a FFT. The output of the FFT circuitry 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
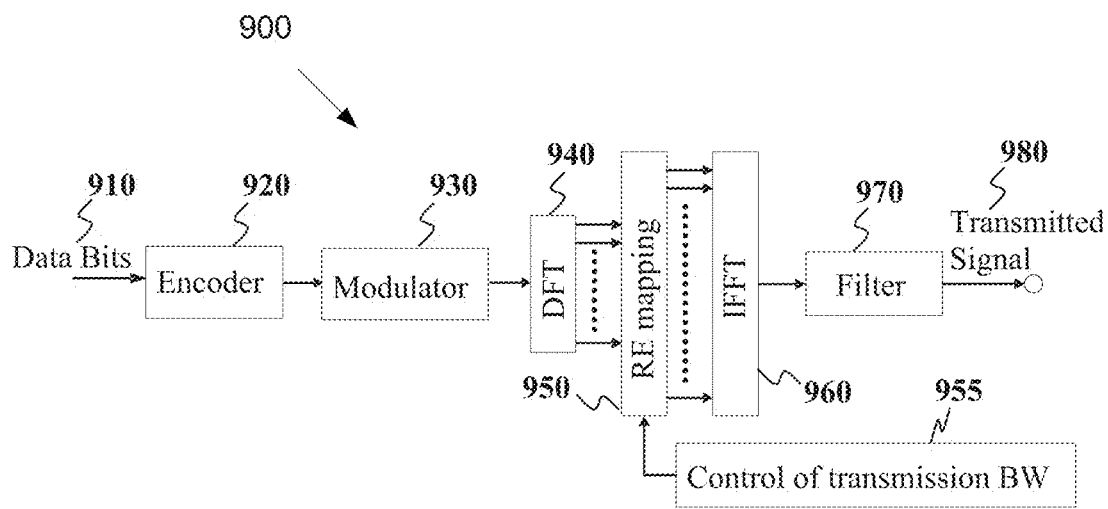
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
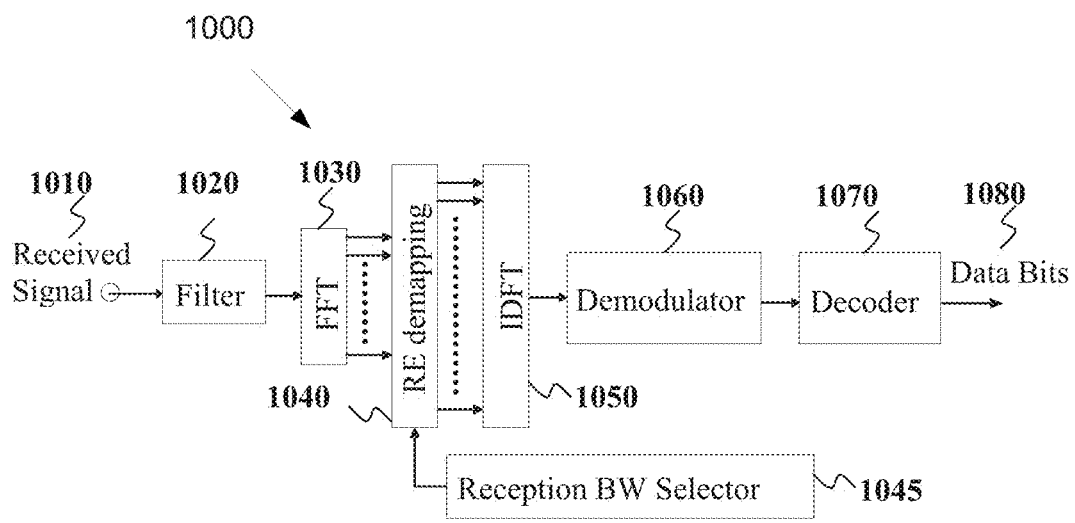
FIG. 10 illustrates an example receiver block diagram for a PUSCH in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
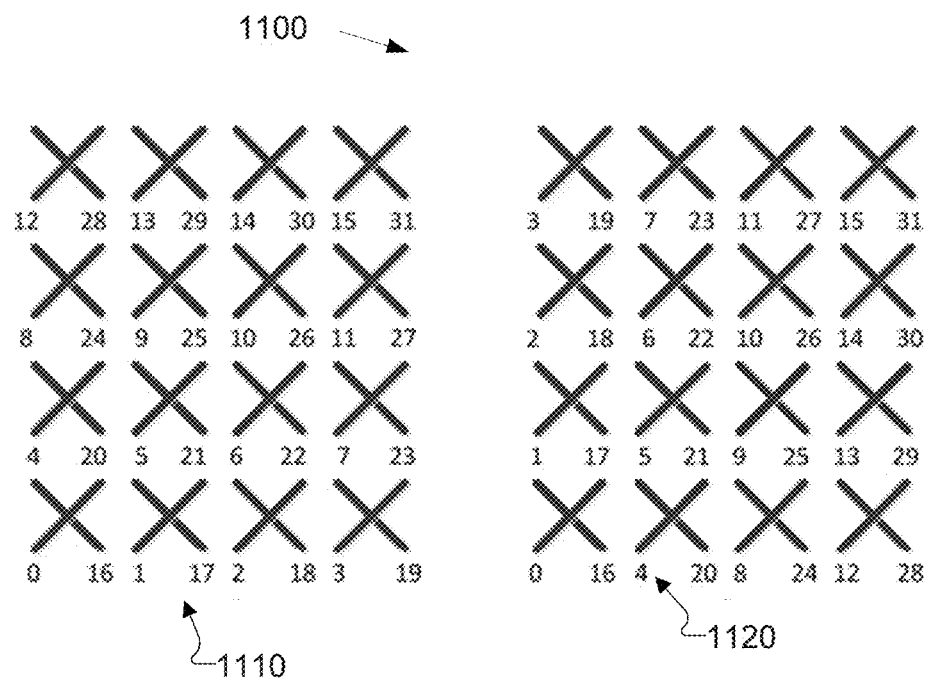
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel. 12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In Rel. 12 of LTE standard, a MIMO precoding for a spatial multiplexing may be performed either with CRS or UE-specific RS. In either case, each UE operating in the spatial multiplexing mode(s) is configured to report channel state information (CSI), which may contain a precoding matrix index (PMI). A PMI report is derived from two antenna ports, four antenna ports, or eight antenna ports. If the eNB 103 follows a PMI recommendation from the UE 116, the eNB 103 is expected to precode its transmitted signal according to a recommended precoding vector or matrix for a given subframe and RB. Regardless whether the eNB 103 follows this recommendation, the UE 116 is configured to report a PMI according to a configured precoding codebook. The PMI including a single index or a pair of indices is associated with a precoding matrix W of size $N_c \times N_L$, where $N_c$ is a number of antenna ports in one row (=number of columns) and $N_L$ is a number of transmission layers. It is assumed that only one row, therefore one dimensional array, is utilized.

TABLE 1 describes codebooks for a rank-1 and a rank-2 CSI reporting for UEs configured to receive 8-antenna-port transmissions. A particular codeword (such as a vector or a matrix) in the codebook is uniquely specified with two indices $i_1$ and $i_2$. To describe the two codebooks, the following two variables are defined:

$$\varphi_n = e^{j\pi n/2}$$

$$v_m = [1\ e^{j2\pi m/32}\ e^{j4\pi m/32}\ e^{j6\pi m/32}]^T \quad (1)$$

TABLE 1

| | $i_2$ | | | |
|---|---|---|---|---|
| $i_1$ | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |
| | $i_2$ | | | |
| $i_1$ | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | $i_2$ | | | |
| $i_1$ | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |
| | $i_2$ | | | |
| $i_1$ | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$.

If the most recently reported rank indicator (RI) is 1, m and n are derived with the two indices $i_1$ and $i_2$ according to TABLE 1 which results in a rank-1 precoding vector:

$$W_{m,n}^{(1)} = \frac{1}{\sqrt{8}} \begin{bmatrix} v_m \\ \varphi_n v_m \end{bmatrix} \quad (2)$$

TABLE 2

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$ If the most recently reported RI is 2, m, m' and n are derived with the two indices $i_1$ and $i_2$ according to Table 2 which results in a rank-2 precoding matrix $$W_{m,m',n}^{(2)} = \frac{1}{4}\begin{bmatrix} v_m & v_{m'} \\ \varphi_n v_m & -\varphi_n v_{m'} \end{bmatrix}.$$

Based on a similar dual-stage concept, the alternative 4-antenna-port codebook supported in Rel. 12 LTE is described as follows:

$\varphi_n = e^{j\pi n/2}$ $\varphi'_n = e^{j2\pi n/32}$ $v'_m = [1\ e^{j2\pi m/32}]^T \quad (3)$ TABLE 3 shows a codebook for 1-layer CSI reporting using antenna ports 0 to 3 or 15-18. TABLES 4 shows a codebook for 2-layer CSI reporting using antenna ports 0 to 3 or 15 to 18.

TABLE 3

| $i_1$ | $i_2$ | | | |
|---|---|---|---|---|
| | 0 | 1 | 2 | 3 |
| 0-15 | $W_{i_1,0}^{(1)}$ | $W_{i_1,8}^{(1)}$ | $W_{i_1,16}^{(1)}$ | $W_{i_1,24}^{(1)}$ |

| $i_1$ | $i_2$ | | | |
|---|---|---|---|---|
| | 4 | 5 | 6 | 7 |
| 0-15 | $W_{i_1+8,2}^{(1)}$ | $W_{i_1+8,10}^{(1)}$ | $W_{i_1+8,18}^{(1)}$ | $W_{i_1+8,26}^{(1)}$ |

TABLE 3-continued

| $i_1$ | $i_2$ | | | |
|---|---|---|---|---|
| | 8 | 9 | 10 | 11 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ |

| $i_1$ | $i_2$ | | | |
|---|---|---|---|---|
| | 12 | 13 | 14 | 15 |
| 0-15 | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \varphi'_n v'_m \end{bmatrix}$

TABLE 4

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$ In Rel. 12 of LTE specification, the aforementioned precoding codebooks are utilized for CSI reporting. Two classes of CSI reporting modes are supported. In one example, PUSCH-based aperiodic CSI (A-CSI) and PUCCH-based periodic CSI (P-CSI) modes are supported. In another example, different modes are defined based on frequency selectivity of CQI and/or PMI, that is, whether wideband or sub-band reporting is performed. The supported CSI reporting modes are given in TABLE 5 and TABLE 6.

TABLE 5 show CQI and PMI feedback types for PUSCH CSI reporting modes.

TABLE 5

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 6 shows CQI and PMI feedback types for PUCCH CSI reporting modes.

TABLE 6

|  |  | PMI Feedback Type | |
|---|---|---|---|
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

For FD-MIMO where 2D antenna array, and therefore 2D precoding, is utilized, the need for a high-performance, scalable, and flexible CSI reporting mechanism is necessary. To achieve high performance, accurate CSI is needed at an eNodeB. This is especially the case for FDD scenarios where short-term channel reciprocity is infeasible. However, designing a CSI reporting mechanism which attains high accuracy with a reasonably low feedback overhead is challenging as more antenna elements are utilized. Especially relevant is an ability to adapt to changes in long-term channel statistics including DL angle of departure (AoD) profile which is characterized by one or a plurality of AoD clusters, each being characterized with one AoD value and angular spread. Unlike short-term channel coefficients, under certain circumstances it is possible to measure long-term channel statistics at an eNodeB even for FDD. Provided that UL-DL duplex distance is not too large, UL-DL long-term reciprocity holds and allows an eNodeB to measure DL AoD profile from uplink signals. If, for some reason, such a measurement scheme is infeasible, a low-rate CSI reporting which contains an indication of DL AoD profile is an alternative venue.

For an FD-MIMO, a precoding matrix, also termed a precoder, which is used by an eNodeB to perform fast (short-term) precoding for transmitting to a UE and assumed by a UE to derive a CSI report, can be described as a dual-stage precoding matrix (analogous to Rel. 12) as shown in Equation (4):

$$P = P\_1 P\_2 \quad (4)$$

Assuming that the total number of transmit antennas at the eNodeB is N_TX and the transmission rank (or the number of layers for spatial multiplexing) is N_L, the size of the precoding matrix P is N_TX×N_L. For dual-polarized array like that depicted in FIG. 11 with N_r rows and N_c columns, the number of transmit antennas is ⌊N_TX=2N⌋_r N_c. Here P_1 pertains to a long-term component. Therefore it is associated with long-term channel statistics such as the aforementioned AoD profile and AoD spread. On the other hand, P_2 pertains to a short-term component which performs selection, co-phasing, or any linear operation to the first component P_1. The precoder P_2, therefore, performs a linear transformation of the long-term component such as a linear combination of a set of basic functions or vectors associated with the column vectors of P_1). The number of columns of P_1 (which is also the number of rows of P_2) corresponds to the size of the set of basic functions which is denoted as N_B.

From a perspective of CSI reporting (feedback), a UE assumes a same long-term precoder component P_1 for all sub-bands (also termed wideband precoding). The short-term component P_2, on the other hand, can be computed for each sub-band (also termed sub-band precoding) as an alternative to wideband precoding report. The UE reports a PMI corresponding to P_1 and another PMI corresponding to P_2. Since the long-term wideband component of the precoder tends to vary slower, the PMI corresponding to P_1 is reported at a rate lower or at most the same as the PMI corresponding to P_2.

The Rel. 12 of LTE codebooks in TABLE 1, 2, 3, and 4 can be described in the same manner. Each of those codebooks is designed for one-dimensional (1D) precoding. For FD-MIMO which utilizes two-dimensional array, however, two-dimensional (2D) precoding is employed where a precoder P can be written as a Kronecker product of two precoders—each for one of the two dimensions. Following a port indexing scheme as shown on FIG. 11, the product precoder can be described as shown in Equation (5):

$$P = (P_{1,H} P_{2,H}) \otimes (P_{1,V} P_{2,V}) = (P_{1,H} \otimes P_{1,V})(P_{2,H} \otimes P_{2,V}) \quad (5)$$

Here, H and V denote horizontal and vertical dimensions. The first representation implies that the overall precoder P can be constructed into horizontal and vertical components via Kronecker product. The second representation implies that each of the long-term and short-term precoders can be constructed with a horizontal precoder and a vertical precoder via Kronecker product. Accordingly, a 2D precoding codebook from two 1D precoding codebooks is constructed based on the aforementioned equations.

Each codeword in a 2D codebook is constructed according to Equation (5). For example, a precoding codebook for FD-MIMO employing a 4×4 dual-polarized array (Nr=4, Nc=4, NTX=32) depicted in FIG. 11 is constructed via Kronecker product from a 4-port single-polarized codebook (for the vertical dimension) and an 8-port dual-polarized codebook (for the horizontal dimension).

If a port indexing scheme as shown in FIG. 11 is followed, the description in equation (5) is rewritten as shown in Equation (6):

$$P = (P_{1,V} P_{2,V}) \otimes (P_{1,H} P_{2,H}) = (P_{1,V} \otimes P_{1,H})(P_{2,V} \otimes P_{2,H}) \quad (6)$$

Compared to Equation (5), equation (6) simply swaps H and V in its description. Codebook constructions assuming this port indexing scheme are obvious extensions of those assuming the port indexing scheme as shown in FIG. 11.

Alternatively, the Kronecker structure can be applied only to the first precoding stage while the second precoding stage performs a linear transformation to the first-stage precoding matrix. In such case, the product precoder can be described as shown in Equation (7):

$$P = (P_{1,H} \otimes P_{1,V}) P_2 \text{ (indexing in 1120 of FIG. 11)}$$

$$P = (P_{1,V} \otimes P_{1,H}) P_2 \text{ (indexing in 1110 of FIG. 7)} \quad (7)$$

To reduce CSI feedback overhead and increase system robustness against CSI impairments, the second-stage precoder in Equations (4)-(7), at least one of the two dimensions, can be replaced with an open-loop diversity scheme such as precoder cycling or large-delay CDD. Such as scheme can be viewed as a semi-open-loop (S-OL) transmission scheme where only a first-stage precoding is performed. In this case, a UE configured with this scheme reports one or more PMIs corresponding to $P_{1,V}$ and/or $P_{1,H}$.

The aforementioned discussion assumes that the serving eNodeB transmits non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage.

Another type of CSI-RS applicable to FD-MIMO is beamformed CSI-RS (BF CSI-RS). In this case, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations may have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNodeB, the UE can be configured to report PMI parameters associated with $P_2$ ($P_{2,V}$ and/or $P_{2,H}$) without P ($P_{1,V}$ and/or $P_{1,H}$).

Each of the aforementioned configurations introduces a different transmission strategy which potentially requires a different CSI reporting format for a configured CSI reporting mode. In addition to these factors, the 2D pattern of CSI-RS port also determines the CSI reporting format. In particular, a flexible configuration mechanism which allows a serving eNodeB to configure a UE with NP CSI-RS and UE-specific BF CSI-RS on a subframe basis is instrumental in improving system performance through CSI-RS overhead reduction and coverage improvement.

As FD-MIMO requires larger codebook sizes, the LTE Rel. 12 periodic CSI reporting on PUCCH (which supports up to 11 bits per reporting instance with PUCCH format 2/2a/2b) cannot be reused. Even in this case, PMI reporting for 8-port CSI-RS is heavily truncated due to codebook subsampling. Enforcing a more aggressive codebook subsampling on 12- or 16-ports CSI-RS may reduce the potential gain of FD-MIMO when periodic CSI reporting is used. Partitioning PMI values across multiple subframes is not desirable since it increases inter-subframe dependence and increases the susceptibility of CSI reporting to error propagation and dropped CSI reports.

In addition, an additional CSI parameter (beside CQI, PMI, and RI) can be introduced to enable beam or NZP CSI-RS resource selection for the so-called cell-specific beamformed CSI-RS (or enhanced vertical sectorization). This parameter is termed beam index (BI) or CSI-RS resource index (CRI) for exemplary and illustrative purposes. Therefore, there is a need to design a periodic CSI reporting scheme based on PUCCH which circumvents the above shortcomings.

In the following, for brevity, FDD is considered as the duplex method for both DL and UL signaling but the embodiments of the invention are also directly applicable to TDD.

Terms such as 'non-precoded' (or 'NP') CSI-RS and 'beamformed' (or 'BF') CSI-RS re-used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially they are a first CSI-RS and a second CSI-RS. The same holds for CSI-RS resource. CSI-RS resources associated with these two types of CSI-RS can be referred to as 'a first CSI-RS resource' and 'a second CSI-RS resource', or 'CSI-RS-A resource' and 'CSI-RS-B resource'.

Throughout the present disclosure, 2D dual-polarized array is used solely for illustrative purposes, unless stated otherwise. Extensions to 2D single-polarized array are straightforward for those skilled in the art. Antenna port indexing as shown in FIG. 11 is assumed throughout this invention disclosure. Extensions for indexing 1120 are straightforward for those skilled in the art. In addition, when the number of rows and columns of the rectangular array of antenna ports are different (denoted here as $M_a$ and $N_a$, respectively), two alternative port indexing embodiments are described in FIG. 12 for an exemplary geometry of ($M_a$, $N_a$)=(2, 4) and (4, 2).

Figure 12:
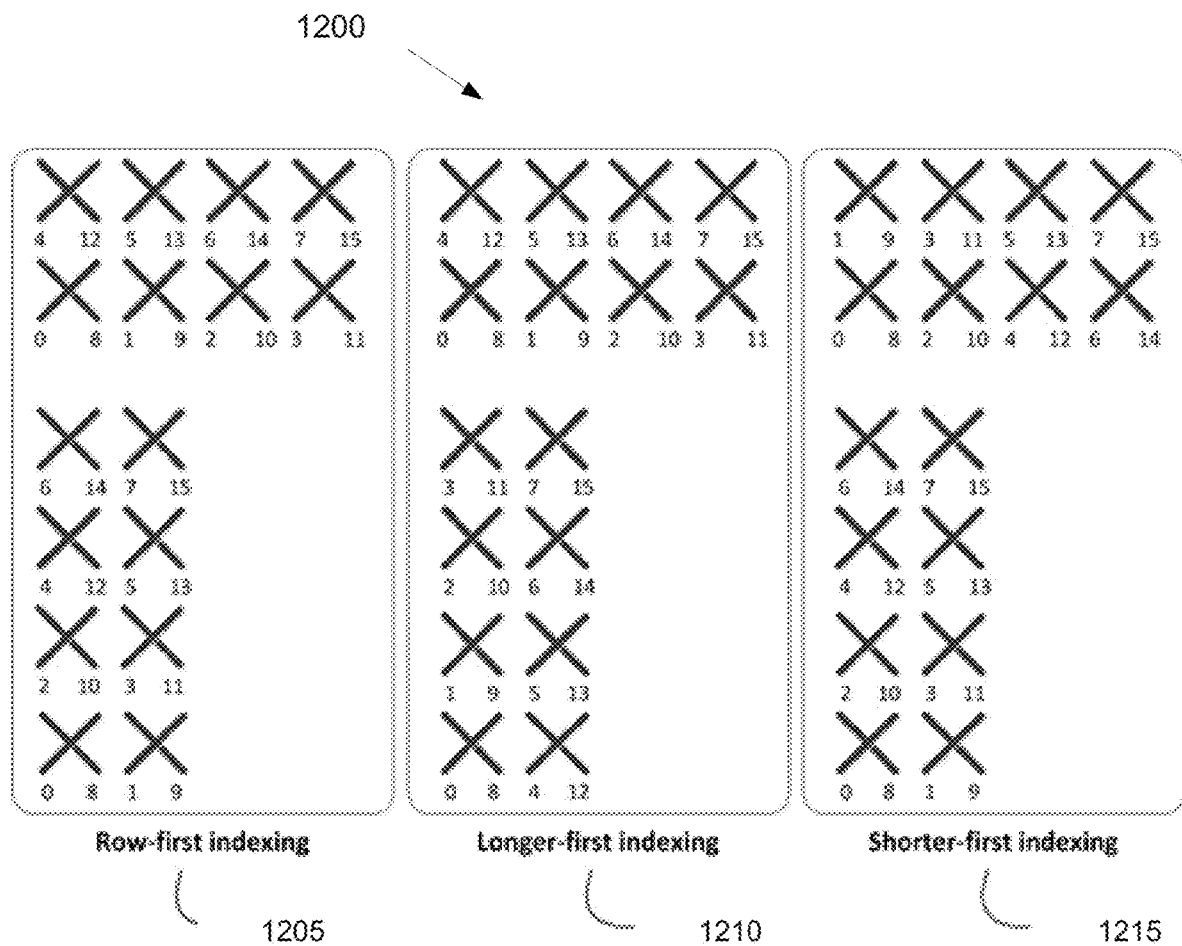
FIG. 12 illustrates an example configuration of an antenna indexing according to embodiments of the present disclosure.

FIG. 12 illustrates an example configuration of an antenna indexing 1200 according to embodiments of the present disclosure. An embodiment of the antenna indexing 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure. As shown in FIG. 12, the antenna indexing 1200 comprises a row-first indexing 1205, a longer-first indexing 1210, and a shorter-first indexing 1215.

The row-first indexing 1205 describes a numbering scheme where antenna ports associated with the same polarization group are indexed in a row-first manner regardless of ($M_a$, $N_a$). The longer-first indexing 1210 indexes antenna ports associated with the same polarization group in a column-first manner when $M_a > N_a$, but row-first manner when $M_a \leq N_a$. The shorter-first indexing 1215 indexes antenna ports associated with the same polarization group in a row-first manner when $M_a > N_a$, but column-first manner when $M_a \leq N_a$.

Accordingly, the longer-first indexing 1210 indexes antenna ports of the same polarization group along the longer dimension first while the shorter-first indexing 1215 along the shorter dimension first. The row-first indexing 1205 is therefore termed row-first indexing while the longer-first indexing 1210 indexing and the shorter-first indexing 1215.

Given the Kronecker designs in (6) or (7), the 2D codebook is formed by taking a Kronecker product between two 1D codebooks, one associated with a linear 1D single-polarized array and the other a linear 1D dual-polarized array.

It is apparent that port indexing 1205 as shown in FIG. 12 requires codebook design for more combinations of ($M_a$, $N_a$) than that for port indexing 1210 or 1215 as shown in FIG. 12 given a set of number of NP CSI-RS ports (=$2M_aN_a$). For example, for systems supporting 8-, 12-, and 16-port NP CSI-RS, the viable combinations of ($M_a$, $N_a$) are (2, 2), (2, 3), (3, 2), (2, 4), and (4, 2). When port indexing 1205 is assumed, each of these 5 combinations requires a 2D codebook design. Therefore, the following 1D codebook designs are required to construct the required 2D codebooks: 1D single-polarized codebook for 2-port (II), 3-port (III), 4-port (IIII) codebooks; 1D dual-polarized codebook: 4-port (XX), 6-port (XXX), 8-port (XXXX) codebooks. But when port indexing 1210 or 1215 is assumed, only (2, 2), (2, 3), and (2, 4) require 2D codebook designs since codebooks for (3, 2), and (4, 2) can be derived from transposing those for (2, 3) and (2, 4), respectively. Therefore, the following 1D codebook designs are required to construct the required 2D codebooks: 1D single-polarized codebook for 2-port (II)

codebook; 1D dual-polarized codebook: 4-port (XX), 6-port (XXX), 8-port (XXXX) codebooks.

If port indexing 1210 is assumed, two possibilities exist. First, the second dimension is associated with horizontal. Second, the second dimension is associated with the longer dimension. If the second dimension is associated with 1D dual-polarized codebook, the second possibility implies that the longer dimension (horizontal if $M_a \leq N_a$, vertical if $M_a > N_a$) is associated with 1D dual-polarized codebook. Although either of the two possibilities is viable, the rest of the present disclosure assumes the second possibility for indexing 1210 as shown in FIG. 12. Extensions of the following descriptions for the first possibility are straightforward for those skilled in the art.

Likewise, if port indexing 1215 (shorter-first) is assumed, the second dimension is associated with the shorter dimension while the longer dimension (horizontal if $M_a \leq N_a$, vertical if $M_a > N_a$) is associated with 1D dual-polarized codebook.

If port indexing 1210 (longer-first) or 12150 (shorter-first) is assumed, a codebook transpose indicator can be used either in CSI process configuration or NZP CSI-RS resource configuration (hence a part of RRC configuration for a UE), especially associated with NP CSI-RS. For instance, if the RRC parameter CBTranspose=0, the UE may assume a wide port geometry ($M_a \leq N_a$). If the RRC parameter CBTranspose=1, the UE may assume a tall port geometry ($M_a > N_a$). Alternatively, a codebook transpose indicator is not necessary if either the number of rows ($M_a$) or the number of columns ($N_a$) or both ($M_a$ and $N_a$) are included either in CSI process configuration or NZP CSI-RS resource configuration in addition to the total number of NP CSI-RS ports. Yet another alternative, instead of ($M_a$, $N_a$), is a codebook selection index from which ($M_a$, $N_a$) can be inferred given a total number of NP CSI-RS ports of $2M_a$, $N_a$. Alternatively, if there is only one possible combination of ($M_a$, $N_a$) for a given total number of NP CSI-RS ports, any signaling (such as the number of rows or the number of columns or the codebook selection index) other than the total number of NP CSI-RS ports is not required.

In terms of the necessary PMI values, equations (5), (6), and (7) can be described in (8) and (9). In (8), the subscripts m and n in $W_{m,n}(i_{m,n})$ denote precoding stage (first or second stage) and dimension (first or second dimension) along with its associated PMI value, respectively. Therefore, the associated PMI values are $\{i_{1,1}, i_{1,2}, i_{2,1}, i_{2,2}\}$ determined as shown in Equation (8).

$$W(i_{1,1},i_{1,2},i_{2,1},i_{2,2}) = (W_{1,1}(i_{1,1})W_{2,1}(i_{2,1})) \otimes (W_{1,2}(i_{1,2})W_{2,2}(i_{2,2})) = (W_{1,1}(i_{1,1}) \otimes W_{1,2}(i_{1,2}))(W_{2,1}(i_{2,1}) \otimes W_{2,2}(i_{2,2})) \quad (8)$$

In Equation (9), $W_2(i_2)$ denotes the second-stage precoding matrix along with its associated PMI value. Therefore, the associated PMI values are $\{i_{1,1}, i_{1,2}, i_2\}$ are determined as shown in Equation (9).

$$W(i_{1,1},i_{1,2},i_2) = (W_{1,1}(i_{1,1}) \otimes W_{1,2}(i_{1,2}))(W_2(i_2)) \quad (9)$$

In some embodiments, a beam index or a CSI-RS resource index or a CSI process index reporting (denoted as BI or CRI or CI) can be specified. In such embodiments, multiple CSI processes are utilized for CSI reporting where one CSI process is associated with a beam (or a virtual sector). In some embodiment, a beam is defined as a collection of NP CSI-RS antenna ports. In such embodiments, a UE measures each of the beams (or virtual sectors), calculates, and reports CSI for each beam (and hence each CSI process). The UE reports a beam index BI which informs the eNodeB of a recommended beam selection. The beam index is denoted as $i_b$ for illustrative purposes. This beam index is reported at a low rate and expected to require 1-2 bits per report. Therefore, for PUCCH-based periodic CSI reporting, a CSI report includes the some CSI parameters, for example, RI, CQI associated with one (for RI=1) or two codewords (RI>1), PMI values: $\{i_{1,1}, i_{1,2}, i_{2,1}, i_{2,2}\}$ or $\{i_{1,1}, i_{1,2}, i_2\}$, BI: $i_b$.

In some embodiments, in LTE systems, legacy CSI content includes CQI, RI, and/or PMI. Depending on the type of CSI, at least one of the three CSI parameters is reported. These signals, together with scheduling requests (SRs) and HARQ ACK/NACKs to be known as uplink control information (UCI), are transmitted over physical uplink control channel (PUCCH) periodically. The amount of UCI, including CQI, RI, and PMI, one UE can transmit within a subframe depends on the number of SC-FDMA symbols reserved and available for uplink control signals, where the number of symbols are specified by multiple supported UCI formats on PUCCH.

Figure 13:
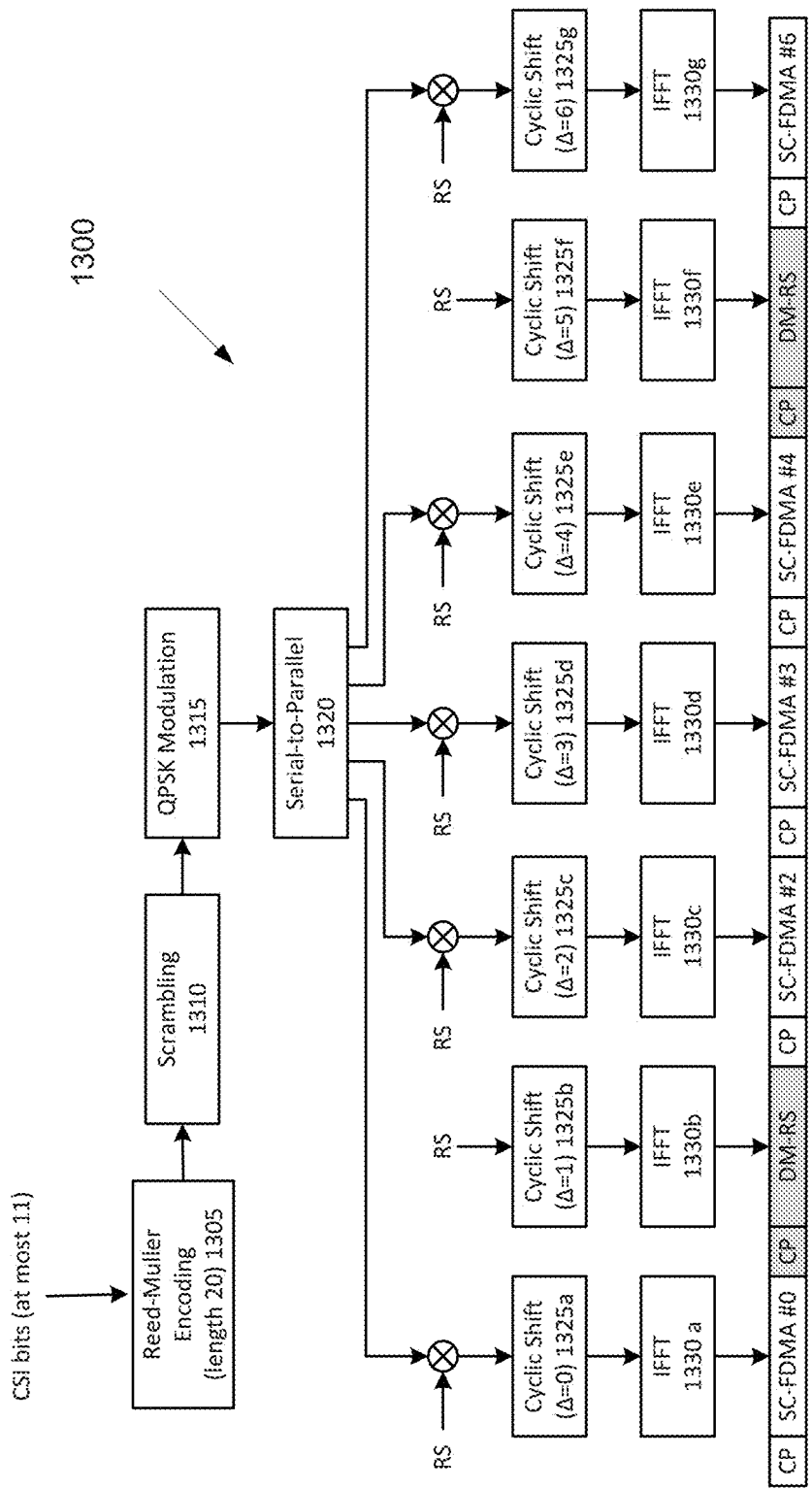
FIG. 13 illustrates an example PUCCH format 2 for channel state information (CSI) transmission according to embodiments of the present disclosure.

FIG. 13 illustrates an example physical uplink control channel (PUCCH) format 2 1300 for CSI transmission according to embodiments of the present disclosure. An embodiment of the PUCCH format 2 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13, the PUCCH format 2 1300 comprises a Reed-Muller encoding block 1305, a scrambling block 1310, a QPSK modulation block 1315, a serial-to-parallel block 1320, a plurality of cyclic shift blocks 1325a-1325g, and a plurality of IFFT blocks 1330a-1330g.

In some embodiments, CSI signaling data can be transmitted using PUCCH Format 2 or 2a/2b, depending on whether HARQ ACK/NACK is multiplexed with CSI signals. For example, if only CSI signals are transmitted, PUCCH Format 2 as shown in FIG. 13 supports at most 11 of CSI information bits coded with rate 1/2 punctured length-20 Reed-Muller codes. The coded bits are scrambled prior to QPSK constellation mapping, and then transmitted on each of 10 SC-FDMA symbols in a subframe (5 SC-FDMA symbols in a slot) by modulating a cyclic time shift of a length-12 RS signal prior to OFDM modulation. These cyclic time shifts are equally spaced and allow multiple UEs to be orthogonal multiplexed on the same RB. The rest 2 symbols are for Reference Signals (RS), where the number of 2 the best tradeoff between demodulation performance and RS overhead.

Figure 14:
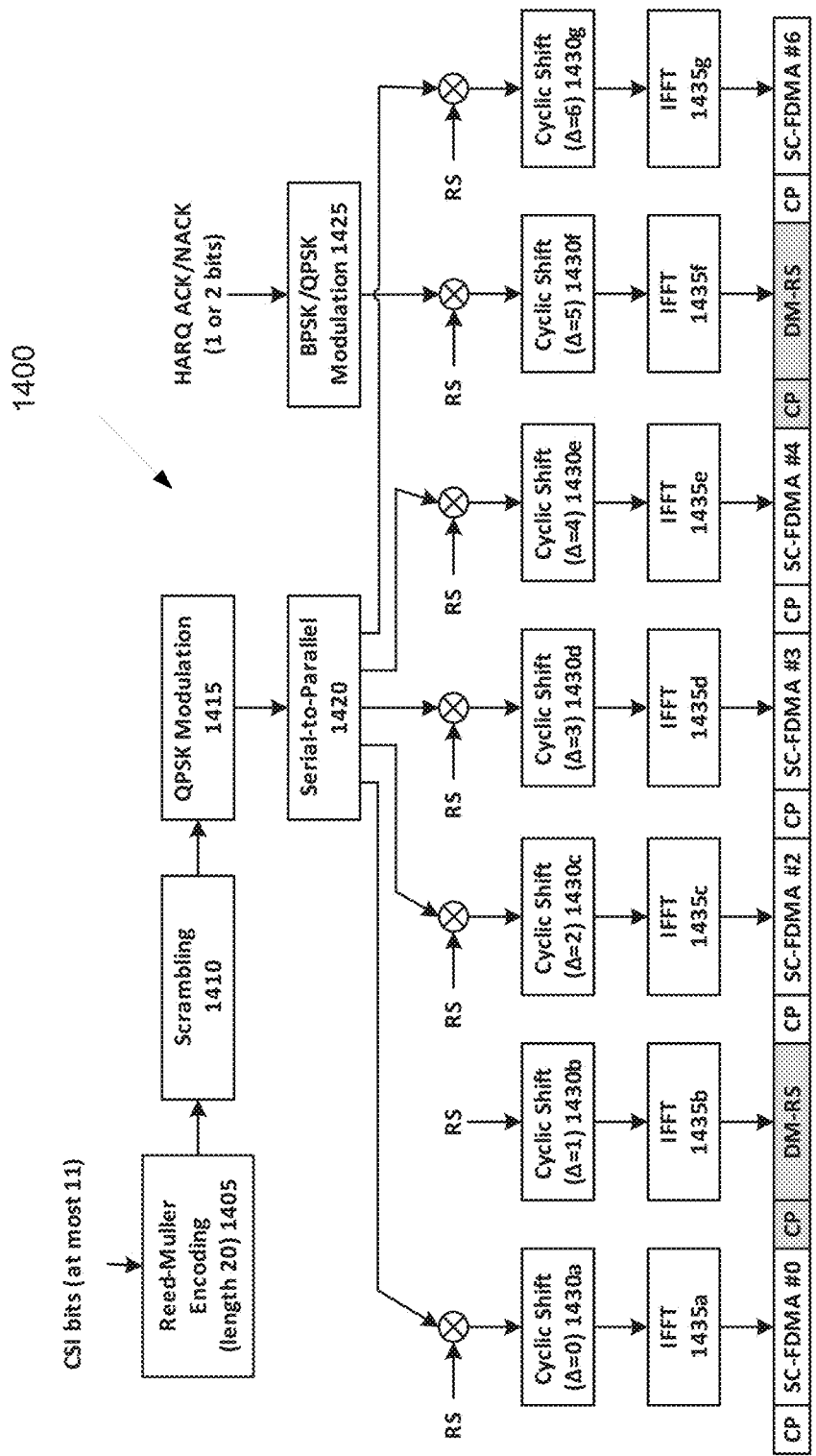
FIG. 14 illustrates an example PUCCH format 2a/2b for simultaneous CSI and hybrid automatic repeat and request (HARD) acknowledgement/negative acknowledgement (ACK/NACK) transmission according to embodiments of the present disclosure.

FIG. 14 illustrates an example PUCCH format 2a/2b 1400 for simultaneous channel status information (CSI) and hybrid automatic repeat and request (HARQ) acknowledgement/negative acknowledgement (ACK/NACK) transmission according to embodiments of the present disclosure. An embodiment of the PUCCH format 2a/2b 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As shown in FIG. 14, the PUCCH format 2a/2b 1300 comprises a Reed-Muller encoding block 1405, a scrambling block 1410, a QPSK modulation block 1415, a serialto-parallel block 1420, a BPSK/QPSK modulation block 1425, a plurality of cyclic shift blocks 1430a-1430g, and a plurality of IFFT blocks 1435a-1435g.

In some embodiments, if CSI and HARQ ACK/NACK are multiplexed and transmitted at the same time within one subframe, PUCCH Format 2a/2b for normal CP supports similar transmission structure to the CSI only case (e.g., Format 2) as shown in FIG. 14, except for particular operations to support 1 or 2 bits HARQ ACK/NACK transmission. These ACK/NACK bits can be BPSK/QPSK modulated (no need to be scrambled first), and then utilized to modulate the second RS symbol in each slot (corresponding to #5 symbol in the slot as shown in FIG. 14).

However, if the increase on payloads of RI, CQI, and PMI for FD-MIMO (e.g. RI 2-3 bits, CQI 4-7 bits, PMI 8-10 bits) occurs, the maximum CSI payload (e.g. 11 bits) supported by PUCCH Format 2/2a/2b may not be sufficient. One alternative is to utilize multiple subframes to transmit one set of RI, CQI, and PMI, which leads to inter-subframe dependence and longer latency. In one embodiment, other PUCCH Formats supporting more information bits (e.g. Format 3, but may not be initially designed for CSI transmission) may be utilized, and in such embodiments, the inter-subframe dependence can be evaded. In another embodiment, a new PUCCH Format can be proposed to support more CSI bits. In such embodiment, the PUCCH Format 3 is proposed to support FD-MIMO feedback transmission, if the total payload of RI, CQI, and PMI exceeds the maximum number of CSI bits supported by Format 2/2a/2b. For instance, the following PUCCH-based CSI reporting scheme is considered.

If the total payload for RI, CQI, and/or PMI is smaller or equal to the maximum number of CSI bits supported by PUCCH Format 2 (e.g. 11 bits), PUCCH Format 2 can still be adopted to transmit feedback reports as shown in FIG. 13.

Figure 15:
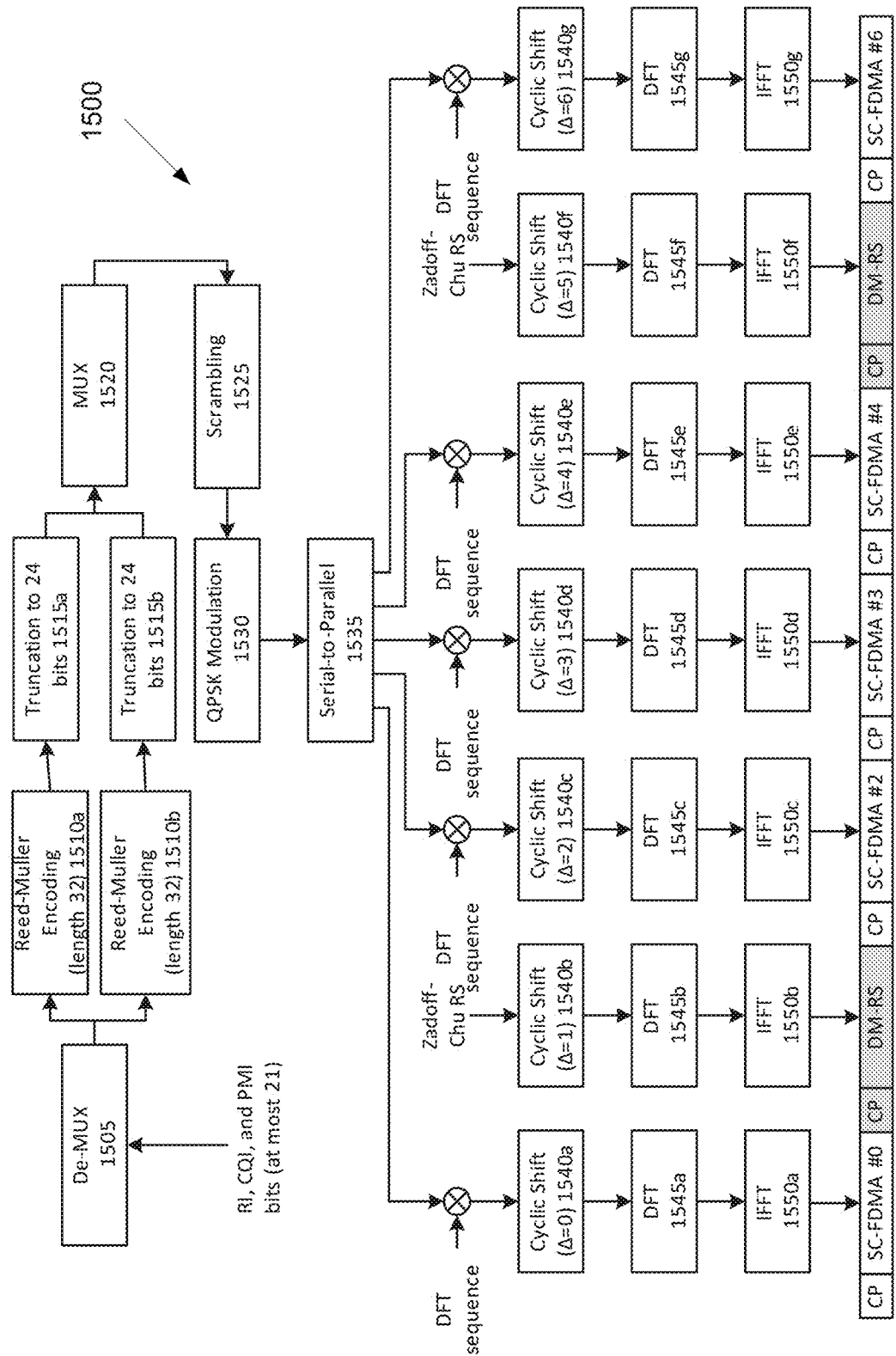
FIG. 15 illustrates an example PUCCH format 3 for a rank indicator (RI), a channel quality indicator (CQI), and a precoding matrix indicator (PMI) transmission according to embodiments of the present disclosure.

FIG. 15 illustrates an example PUCCH format 3 1500 for rank indicator (RI), channel quality indicator (CQI), and precoding matrix indicator (PMI) transmission according to embodiments of the present disclosure. An embodiment of the PUCCH format 3 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15, the PUCCH format 3 1500 comprises a DeMUX block 1505, a plurality of Reed-Muller encoding block 1510a and 1510b, a plurality of truncation to 24 bit blocks 1515a and 1515b, a MUX block 1520, a scrambling block 1525, a QPSK modulation block 1530, a serial-to-parallel block 1535, a plurality of cyclic shift blocks 1540a-1540g, a plurality of DFT blocks 1545a-1545g, and a plurality of IFFT blocks 1550a-1550g.

If the total payload for RI, CQI, and/or PMI are greater than the maximum number of CSI bits supported by PUCCH Format 2 (e.g. 11 bits), yet smaller or equal to the number of information bits supported by PUCCH Format 3 (e.g. 21 bits for CSI, or 22 bits for all), PUCCH Format 3 can be adopted to transmit feedback reports.

In some embodiments, alternate CSI bits are De-MUX to two separate Reed-Muller encoding processes (with length 32). After truncation, encoded bits are alternately MUX back to a codeword (with length 48). In some embodiments, PUCCH Format 3 is not based on Zadoff-Chu sequences for CSI data symbols, but using DFT-Spread OFDM waveform. Orthogonal cover sequence (e.g. DFT sequence with length 5) is applied to the encoded CSI bits. In some embodiments, the demodulation RS is the same as Format 2, i.e., no orthogonal cover sequence applied and Zadoff-Chu sequences utilized.

The symbol functionalities are the same as Format 2, i.e., the second and fifth symbols in a slot are utilized for DM-RS transmission, while the remaining ones are for CSI bits.

If the total payload for RI, CQI, and/or PMI is even higher than the number of information bits supported by PUCCH Format 3 (e.g. 21 bits for CSI, or 22 bits for all), PUSCH can be adopted for transmission. In one embodiment, CSI information bits can be multiplexed into normal data bits and transmitted on PUSCH. Here, all information bits are encoded with turbo codes using rate matching adaptation. DFT-Spread OFDM is utilized over the coded bits to generate signals for transmission. The above embodiments pertain to CSI reporting for only one component carrier (PCell) with class A or class B CSI reporting. In another embodiment, only part of the CSI information bits are multiplexed into the PUSCH within the same subframe, where the part of bits can be the overflow bits from the capacity of PUCCH, or selected bits from the overall CSI bits such that the remaining ones can fits PUCCH format. The above embodiments pertain to CSI reporting for only one component carrier (PCell) with class A or class B CSI reporting.

In some embodiments, CQI and PMI can be transmitted separately from RI. For example, If the total payload for CQI and PMI are greater than the maximum number of CSI bits supported by PUCCH Format 2 (e.g. 11 bits), yet smaller or equal to the number of information bits supported by PUCCH Format 3 (e.g. 21 bits for CSI, or 22 bits for all), PUCCH Format 3 can be adopted to transmit CQI and PMI. In separate subframes, RI can be transmitted using PUCCH Format 2/2a/2b.

In some embodiments, if uplink grant is not available in this subframe, no PUSCH can be utilized. In such embodiments, CSI bits can be separated (e.g. CQI and PMI can be transmitted separately from RI), and part of the bits are dropped.

BI is a new type of UCI, which originates from FD-MIMO. The transmission of BI by UEs can also be periodic, whenever the transmission of BI is available. Typically, The BI has a relatively slower reporting frequency (i.e., larger period) compared to RI, CQI, and PMI. Therefore, The BI can be reported separately from CQI/PMI/RI. Regarding the number of bits required for BI, different PUCCH-based CSI reporting schemes are proposed for BI transmission when BI is reported without CQI/PMI/RI in a given subframe.

Figure 16:
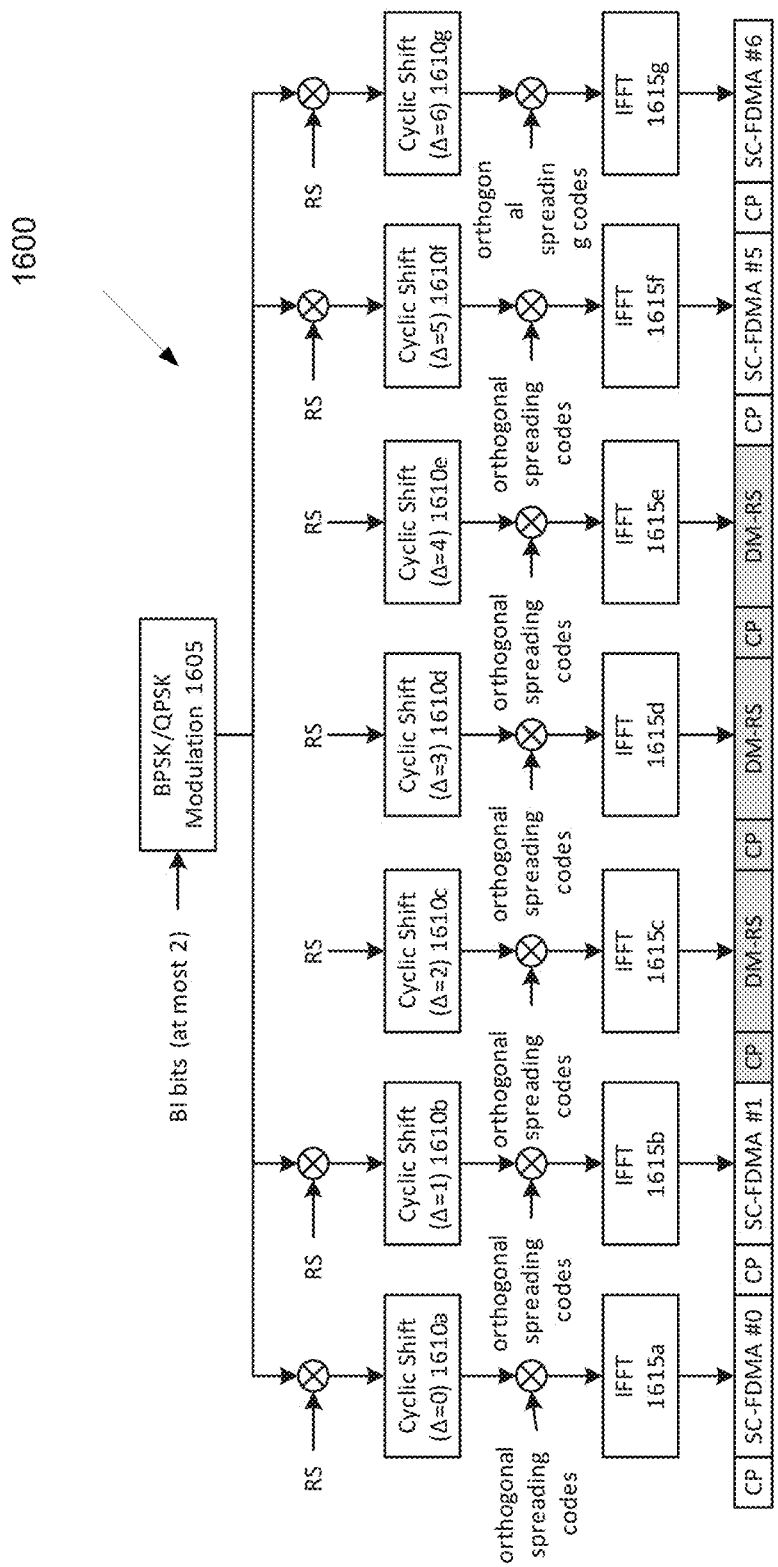
FIG. 16 illustrates an example PUCCH format 1a/1b for a beam index (BI) transmission according to embodiments of the present disclosure.

FIG. 16 illustrates an example PUCCH format 1a/1b 1600 for beam index (BI) transmission according to embodiments of the present disclosure. An embodiment of the PUCCH format 1a/1b 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As shown in FIG. 16, the PUCCH format 1a/1b 1600 comprises a BPSK/QPSK modulation block 1605, a plurality of cyclic shift blocks 1610a-1610g, and a plurality of IFFT blocks 1615a-1615g.

In some embodiment, if the payload for BI is only 1 or 2 bits, similar PUCCH format (e.g. Format 1a/1b) for HARQ ACK/NACK can be utilized for BI transmission. For example, as shown in FIG. 16, in one OFDM slot (7 symbols for normal CP), 3 symbols in the middle are reserved for RS transmission, while the remaining 4 on the edge are utilized for BI transmission. 1 bit or 2 bits BI information bits are modulated using BPSK or QPSK, and then are modulated by a time-shifted base RS. Finally, the output signals are modulated using orthogonal spreading codes (e.g. Walsh-Hadamard or DFT sequence).

In some embodiments, if the payload for BI exceeds 2 bits, PUCCH Format 2 can be utilized for BI transmission (similar to the transmission of RI, CQI, and PMI). Currently, the number of BI bits may not exceed the maximum supported CSI bits for Format 2 (e.g. 11 bits). In such embodiments, CSI reporting for only one component carrier (PCell) with class B CSI reporting when BI reporting is activated.

The transmission of CQI, RI, and PMI has different period from the transmission of BI. It is possible that these two sets of CSI parameters be transmitted simultaneously within the same subframe. In some embodiments, a UE can drop the transmission of RI, CQI, and/or PMI, and only transmits BI using a proper PUCCH format based on the required bits from BI. That is, BI is assigned the highest priority among CSI parameters. In some embodiments, a UE can multiplex BI together with the transmission of RI, CQI, and/or PMI, and considers BI as regular CSI bits as RI, CQI, and PMI. In one example, if the total payload for all CSI bits, including RI, CQI, PMI, and/or BI, is no more than 11 bits, a UE can use PUCCH Format 2 to multiplex all CSI bits into the same RB and subframe for transmission. In another example, if the total payload for all CSI bits, including RI, CQI, PMI, and/or BI, is more than 11 bits, but smaller than 22 bits, UE can use PUCCH Format 3 to multiplex all CSI bits into the same RB for and subframe transmission.

In some embodiments, a UE can multiplex BI into the transmission of RI, CQI, and PMI, and treats with BI separately. If the payload for BI is no more than 2 bits, BI can be modulated into one of the RS signals. If the payload for BI exceeds 2 bits, BI can be considered as regular CSI and be treated the same way as the aforementioned embodiments. In one example, if the total payload for RI, CQI, and PMI is no more than 11 bits, and the payload for BI is no more than 2 bits, UE can use PUCCH Format 2a/2b for simultaneous transmission, where BI bits are modulated into one of the RS symbols as shown in FIG. 14. In another example, if the total payloads for RI, CQI, and PMI range from 12 bits to 21 bits, and the payload for BI is no more than 2 bits, UE can use modified PUCCH Format 3 (can be defined as new formats, e.g. PUCCH Format 3a/3b) for simultaneous transmission, where BI bits are modulated into one of the RS symbols as shown in FIG. 17.

Figure 17:
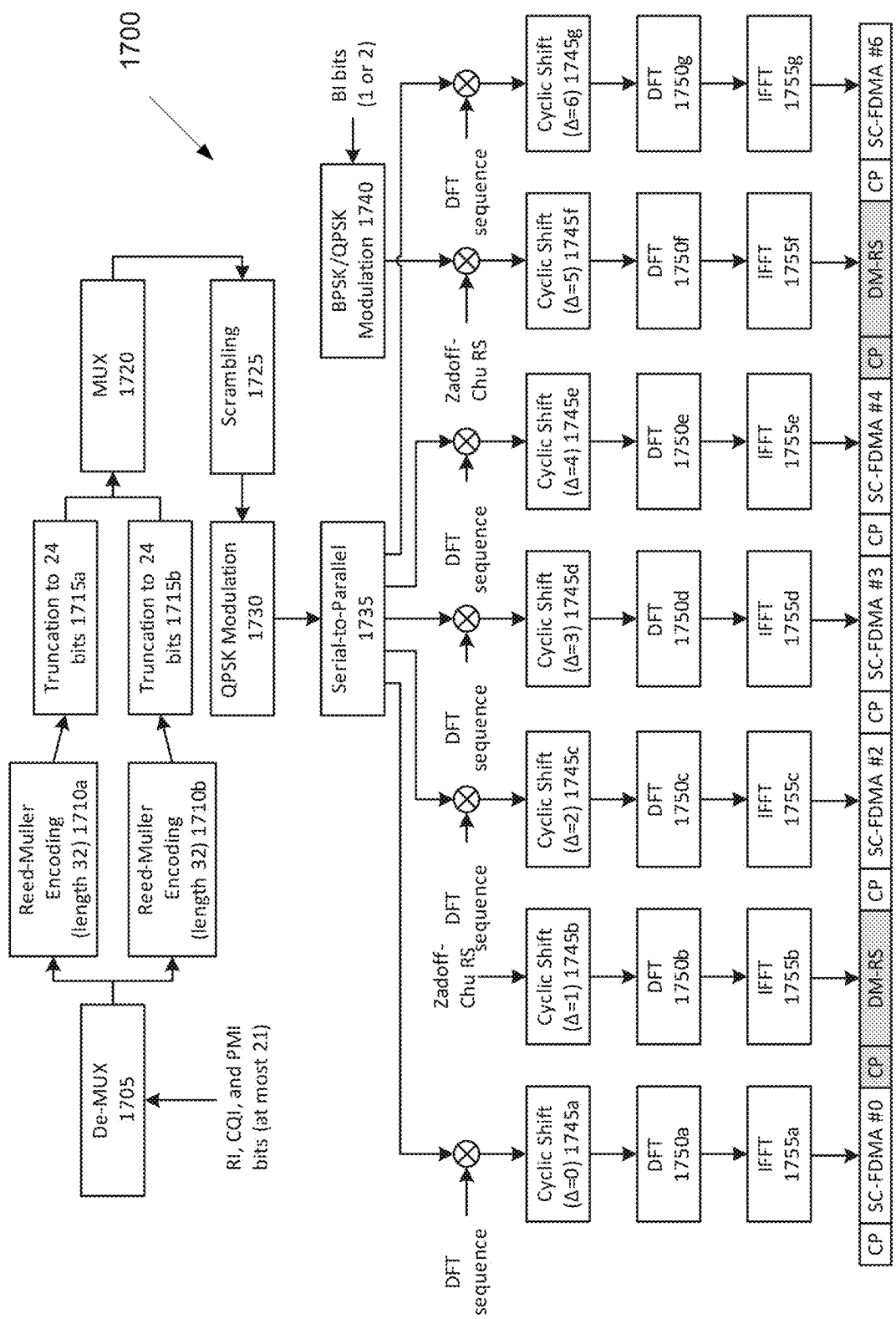
FIG. 17 illustrates an example PUCCH format 3 for simultaneous transmission of BI, RI, CQI, and PMI according to embodiments of the present disclosure.

FIG. 17 illustrates an example PUCCH format 3 1700 for simultaneous transmission of BI, RI, CQI, and PMI according to embodiments of the present disclosure. An embodiment of the PUCCH format 3 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As shown in FIG. 17, the PUCCH format 3 1700 comprises a DeMUX block 1705, a plurality of Reed-Muller encoding block 1710a and 1710b, a plurality of truncation to 24 bit blocks 1715a and 1715b, a MUX block 1720, a scrambling block 1725, a QPSK modulation block 1730, a serial-to-parallel block 1735, a BPSK/QPSK modulation block 1740, a plurality of cyclic shift blocks 1745a-1745g, a plurality of DFT blocks 1750a-1750g, and a plurality of IFFT blocks 1755a-1755g.

In some embodiments, when an instance of BI occurs in the same subframe as RI, BI is multiplexed with RI using PUCCH Format 2/2a/2b. But when an instance of BI occurs in the same subframe as CQI, PMI, and/or RI, CQI, PMI and/or RI are dropped. In one example, if the total payload for RI and BI is no more than 11 bits, UE can use PUCCH Format 2 to multiplex BI and RI into the same RB and subframe for transmission. In another example, if the total payload for RI and BI is more than 11 bits, but smaller than 22 bits, UE can use PUCCH Format 3 to multiplex BI and RI into the same RB and subframe for transmission.

In some embodiments, BI is always reported together with RI and BI is multiplexed with RI using PUCCH Format 2/2a/2b. Therefore, RI and BI share the same subframe offset and reporting periodicity. But when an instance of BI and RI occurs in the same subframe as CQI and/or PMI, CQI and/or PMI are dropped. In one example, if the total payload for RI and BI is no more than 11 bits, a UE can use PUCCH Format 2 to multiplex BI and RI into the same RB and subframe for transmission. In another example, if the total payload for RI and BI is more than 11 bits, but smaller than 22 bits, a UE can use PUCCH Format 3 to multiplex BI and RI into the same RB and subframe for transmission. In such embodiments, the value of RI corresponds to a recommended transmission rank for a recommended beam selection (the value of BI). The aforementioned embodiments pertain to CSI reporting for only one component carrier (PCell) with class B CSI reporting when BI reporting is activated.

The simultaneous transmission of FD-MIMO CSI feedback and HARQ ACK/NACK can be enabled by UE-specific higher layer signaling. In subframes where simultaneous transmission is enabled, the RI, CQI, PMI, BI, and the 1 or 2 bits HARQ ACK/NACK needs to be multiplexed. For example, if the payloads for CSI, including BI, RI, CQI, and PMI, are no more than 11 bits, PUCCH Format 2a/2b can be adopted to modulate the HARQ ACK/NACK modulation symbol into one of the RS symbols (as shown in FIG. 14), such that CSI (within 11 bits) can be transmitted simultaneously with HARQ ACK/NACK (within 2 bits). In another example, if the payloads for CSI, including BI, RI, CQI, and PMI, range from 12 bits to 21 bits, the previously proposed PUCCH Format 3a/3b (as shown in FIG. 16) can be adopted, where HARQ ACK/NACK is also modulated into one of the RS symbols. In another example, if the payloads for CSI exceed the maximum supported bits for PUCCH Format 3 (e.g. 21 bits for CSI, or 22 bits for all), PUSCH can be utilized to transmit all CSI bits and HARQ ACK/NACK bits (if uplink is available in this subframe).

In one embodiment, all bits in PUSCH are transmitted. In another embodiment, part of the bits in PUSCH (e.g. the overflow bits from PUCCH capacity) is transmitted. If uplink grant is not available, the CSI bits can be separated and some of the bits may be dropped. Meanwhile, in one variant to this example, CQI and PMI can be transmitted separately (in separate subframes) from RI or BI. In such embodiment, when HARQ ACK/NACK bit(s) are to be transmitted in a same subframe as CQI and PMI, HARQ ACK/NACK can be multiplexed with CQI and PMI using PUCCH Format 3. This multiplexing is done via joint encoding of HARQ ACK/NACK and CQI/PMI. In such embodiment, when HARQ ACK/NACK bit(s) are to be transmitted in a same subframe as RI, HARQ ACK/NACK can be multiplexed with RI using PUCCH Format 2/2a/2b.

This multiplexing is done by co-phasing two DMRS symbols according to the HARQ ACK/NACK hypothesis. In such embodiment, when HARQ ACK/NACK bit(s) are to be transmitted in a same subframe as BI, HARQ ACK/NACK can be multiplexed with BI using PUCCH Format 2/2a/2b. This multiplexing is done by co-phasing two DMRS symbols according to the HARQ ACK/NACK hypothesis.

Except for considering payload size of CSI reports as the metric to determine the PUCCH format, CSI reporting class can also be utilized to determine the PUCCH format.

In some embodiments, if the RRC parameter CSI.Reporting.Type or eMIMO-Type indicates class A CSI reporting, mode 1-1 periodic CSI reporting is described as follows: report CQI and all PMI values (i1 and i2) jointly in a set of subframes using format 3 PUCCH and report RI in a separate set of subframes using format 2/2a/2b PUCCH. In such embodiment, each report is possibly multiplexed with HARQ ACK/NACK.

In some embodiments, if the RRC parameter CSI.Reporting.Type or eMIMO-Type indicates class B CSI reporting with K=1 and PMI.Config=1, mode 1-1 periodic CSI reporting is described as follows: report CQI and PMI jointly in a set of subframes using format 2/2a/2b PUCCH and report RI in a separate set of subframes using format 2/2a/2b PUCCH. In such embodiments, each report is possibly multiplexed with HARQ ACK/NACK.

In some embodiments, if the RRC parameter CSI.Reporting.Type or eMIMO-Type indicates class A CSI reporting, mode 1-1 periodic CSI reporting is described as follows: report CQI, all PMI values (i1 and i2), and RI jointly in a set of subframes using format 3 PUCCH. In such embodiments, each report is possibly multiplexed with HARQ ACK/NACK.

In some embodiments, if the RRC parameter CSI.Reporting.Type or eMIMO-Type indicates class B CSI reporting with K=1 and PMI.Config=1, mode 1-1 periodic CSI reporting is described as follows: report CQI and PMI jointly in a set of subframes using format 2/2a/2b PUCCH and report RI in a separate set of subframes using format 2/2a/2b PUCCH. In such embodiments, each report is possibly multiplexed with HARQ ACK/NACK.

In Rel. 13 of LTE specification, MIMO precoding (for beamforming or spatial multiplexing) can be facilitated via PMI (i.e. precoding codebook index) reporting as a component of CSI (channel state information) reporting. In some embodiment, PMI report is derived from standardized codebooks for two antenna ports (e.g., single-stage). In some embodiments, PMI report is derived from standardized codebooks for four antenna ports (e.g., single-stage or dual-stage. In some embodiments, PMI report is derived from standardized codebooks for eight antenna ports (e.g., dual-stage). In some embodiments, PMI report is derived from standardized codebooks for configurable dual-stage eMIMO-Type of 'CLASS A' codebook for eight, twelve, or sixteen antenna ports (e.g., known as 'nonPrecoded'). In some embodiments, PMI report is derived from standardized codebooks for single-stage eMIMO-Type of 'CLASS B' codebook for two, four, or eight antenna ports: (e.g., known as 'beamformed').

If an eNodeB follows a PMI recommendation from a UE, the eNodeB is expected to precode its transmitted signal according to a recommended precoding vector or matrix for a given subframe and RB. Regardless whether the eNodeB follows this recommendation, the UE is configured to report a PMI according to a configured precoding codebook. Here a PMI, which may include a single index or a pair of indices, is associated with a precoding matrix W in an associated codebook.

When dual-stage class A codebook is configured, a resulting precoding matrix can be described in Equation (10). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components.

The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basic functions or vectors associated with the column vectors of $W_{1,1}(i_{1,1}) \otimes W_{1,2}(i_{1,2})$.

$$W(i_{1,1}, i_{1,2}, i_2) = \underbrace{(W_{1,1}(i_{1,1}) \otimes W_{1,2}(i_{1,2}))}_{w_1(i_{1,1}, i_{1,2})} W_2(i_2) \quad (10)$$

The aforementioned discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage. In addition, when UE-specific beamforming is applied to CSI-RS resource (termed the UE-specific or UE-specifically beamformed CSI-RS), CSI-RS overhead reduction is possible.

UE complexity reduction is also evident since the configured number of ports tends to be much smaller than its NP CSI-RS counterpart. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel. 13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In Rel. 12 and Rel. 13 of LTE specification, the aforementioned precoding codebooks are utilized for CSI reporting. In such instance, two schemes of CSI reporting modes may be supported, for example, PUSCH-based aperiodic CSI (A-CSI) and PUCCH-based periodic CSI (P-CSI). In each of schemes, different modes are defined based on frequency selectivity of CQI and/or PMI, that is, whether wideband or subband reporting is performed. The supported CSI reporting modes are shown in TABLE 5 and TABLE 6.

In the Rel. 13 rank-1 PMI codebook of LTE specification, for 8 antenna ports {15, 16, 17, 18, 19, 20, 21, 22}, 12 antenna ports {15, 16, 17, 18, 19, 20, 21, 22, 23, 24, 25, 26}, 16 antenna ports {15, 16, 17, 18, 19, 20, 21, 22, 23, 24, 25, 26, 27, 28, 29, 30}, and a UE configured with higher layer parameter eMIMO-Type, and eMIMO-Type is set to 'CLASS A', each PMI value corresponds to three codebook indices may be defined, where the quantities $\varphi_n$, $u_m$ and $v_{l,m}$ are determined as shown in Equation (11):

$$\varphi_n = e^{j\pi n/2} \quad (11)$$
$$u_m = \left[ 1 \quad e^{j\frac{2\pi m}{O_2 N_2}} \quad \ldots \quad e^{j\frac{2\pi m(N_2-1)}{O_2 N_2}} \right]$$
$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T$$

In Equation (111), the values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of $(O_1, O_2)$ and $(N_1, N_2)$ for a given number of CSI-RS ports are given in TABLE 7. In TABLE 7, the number of CSI-RS ports, P, is $2N_1N_2$.

TABLE 7

| Number of CSI-RS antenna ports, P | $(N_1, N_2)$ | $(O_1, O_2)$ |
| --- | --- | --- |
| 8 | (2, 2) | (4, 4), (8, 8) |
| 12 | (2, 3) | (8, 4), (8, 8) |
| | (3, 2) | (8, 4), (4, 4) |
| 16 | (2, 4) | (8, 4), (8, 8) |
| | (4, 2) | (8, 4), (4, 4) |
| | (8, 1) | (4, —), (8, —) |

TABLE 8 shows codebook for 1 layer CSI reporting using antenna ports 15 to 14+P.

TABLE 8

| Value of Codebook-Config | $i_{1,1}$ | $i_{1,2}$ | $i_2$ = 0 | 1 | 2 | 3 |
| --- | --- | --- | --- | --- | --- | --- |
| 1 | $0, 1, \ldots, O_1N_1 - 1$ | $0, 1, \ldots, O_2N_2 - 1$ | $W_{i_{1,1},i_{1,2},0}^{(1)}$ | $W_{i_{1,1},i_{1,2},1}^{(1)}$ | $W_{i_{1,1},i_{1,2},2}^{(1)}$ | $W_{i_{1,1},i_{1,2},3}^{(1)}$ |

| Value of Codebook-Config | $i_{1,1}$ | $i_{1,2}$ | $i_2$ = 0 | 1 | 2 | 3 |
| --- | --- | --- | --- | --- | --- | --- |
| 2 | $0, 1, \ldots, \frac{N_1 O_1}{2} - 1$ | $0, 1, \ldots, \frac{N_2 O_2}{2} - 1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |

| Value of Codebook-Config | $i_{1,1}$ | $i_{1,2}$ | $i_2$ = 4 | 5 | 6 | 7 |
| --- | --- | --- | --- | --- | --- | --- |
| 2 | $0, 1, \ldots, \frac{N_1 O_1}{2} - 1$ | $0, 1, \ldots, \frac{N_2 O_2}{2} - 1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |

TABLE 8-continued

| Value of Codebook-Config | $i_{1,1}$ | $i_{1,2}$ | $i_2$ = 8 | 9 | 10 | 11 |
|---|---|---|---|---|---|---|
| 2 | $0, 1, \ldots, \frac{N_1O_1}{2} - 1$ | $0, 1, \ldots, \frac{N_2O_2}{2} - 1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,2}^{(1)}$ | $W_{2i_{1,1},2i_{1,2}+1,3}^{(1)}$ |

| Value of Codebook-Config | $i_{1,1}$ | $i_{1,2}$ | $i_2$ = 12 | 13 | 14 | 15 |
|---|---|---|---|---|---|---|
| 2 | $0, 1, \ldots, \frac{N_1O_1}{2} - 1$ | $0, 1, \ldots, \frac{N_2O_2}{2} - 1$ | $W_{2i_{1,1}+1,2i_{1,2}+1,0}^{(1)}$ | $W_{2i_{1,1}+1,2i_{1,2}+1,1}^{(1)}$ | $W_{2i_{1,1}+1,2i_{1,2}+1,2}^{(1)}$ | $W_{2i_{1,1}+1,2i_{1,2}+1,3}^{(1)}$ |

| Value of Codebook-Config | $i_{1,1}$ | $i_{1,2}$ | $i_2$ = 0 | 1 | 2 | 3 |
|---|---|---|---|---|---|---|
| 3 | $0, 1, \ldots, \frac{N_1O_1}{2} - 1$ | $0, 1, \ldots, \frac{N_2O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ = 4 | 5 | 6 | 7 |
|---|---|---|---|---|---|---|
| 3 | $0, 1, \ldots, \frac{N_1O_1}{2} - 1$ | $0, 1, \ldots, \frac{N_2O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| Value of Codebook-Config | $i_{1,1}$ | $i_{1,2}$ | $i_2$ = 8 | 9 | 10 | 11 |
|---|---|---|---|---|---|---|
| 3 | $0, 1, \ldots, \frac{N_1O_1}{2} - 1$ | $0, 1, \ldots, \frac{N_2O_2}{2} - 1$ | $W_{2x+1,2y+1,0}^{(1)}$ | $W_{2x+1,2y+1,1}^{(1)}$ | $W_{2x+1,2y+1,2}^{(1)}$ | $W_{2x+1,2y+1,3}^{(1)}$ |

| Value of Codebook-Config | $i_{1,1}$ | $i_{1,2}$ | $i_2$ = 12 | 13 | 14 | 15 |
|---|---|---|---|---|---|---|
| 3 | $0, 1, \ldots, \frac{N_1O_1}{2} - 1$ | $0, 1, \ldots, \frac{N_2O_2}{2} - 1$ | $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ |

| Value of Codebook-Config | $i_{1,1}$ | $i_{1,2}$ | $i_2$ = 0 | 1 | 2 | 3 |
|---|---|---|---|---|---|---|
| 4 | $0, 1, \ldots, \frac{N_1O_1}{2} - 1$ | $0, 1, \ldots, \frac{N_2O_2}{2} - 1$ | $W_{2x,2y,0}^{(1)}$ | $W_{2x,2y,1}^{(1)}$ | $W_{2x,2y,2}^{(1)}$ | $W_{2x,2y,3}^{(1)}$ |

| Value of Codebook-Config | $i_{1,1}$ | $i_{1,2}$ | $i_2$ = 4 | 5 | 6 | 7 |
|---|---|---|---|---|---|---|
| 4 | $0, 1, \ldots, \frac{N_1O_1}{2} - 1$ | $0, 1, \ldots, \frac{N_2O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| Value of Codebook-Config | $i_{1,1}$ | $i_{1,2}$ | $i_2$ = 8 | 9 | 10 | 11 |
|---|---|---|---|---|---|---|
| 4 | $0, 1, \ldots, \frac{N_1O_1}{2} - 1$ | $0, 1, \ldots, \frac{N_2O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

TABLE 8-continued

| Value of Codebook-Config | $i_{1,1}$ | $i_{1,2}$ | $i_2$ | | | |
|---|---|---|---|---|---|---|
| | | | 12 | 13 | 14 | 15 |
| 4 | $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $W_{l,m,n}^{(1)} = \frac{1}{\sqrt{P}} \begin{bmatrix} v_{l,m} \\ \varphi_n v_{l,m} \end{bmatrix}$ where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{m,l} \\ \varphi_n v_{m,l} \end{bmatrix}$, if $N_1 < N_2$ In LTE systems, legacy CSI content includes CQI, RI, and/or PMI. Depending on the type of CSI, at least one of the three CSI parameters is reported. These signals, together with Scheduling Requests (SRs) and HARQ ACK/NACKs to be known as uplink control information (UCI), are transmitted over physical uplink control channel (PUCCH) periodically. The amount of UCI, including CQI, RI, and PMI, one UE can transmit within a subframe depends on the number of SC-FDMA symbols reserved and available for uplink control signals, where the number of symbols are specified by multiple supported UCI formats on PUCCH.

For $(N_1, N_2) = (2, 4)$ and $(O_1, O_2) = (8, 8)$ in TABLE 7, the number of bits to report the two PMI indices $(i_{1,1}, i_{1,2})$ and $i_2$ is 11. The other CSI components such as RI can take 2-3 bits and CQI can take 4-7 bits. So, the total number of CSI reporting bits can be up to 21 bits, which is maximum that can be supported using PUCCH format 3. The future generation of communication systems, such as LTE Rel. 14 and beyond, and 5G, may likely to have more number of antenna ports than the ones currently supported by the standards.

FIG. 18 illustrates an example dual-polarized antenna port layout 1800 according to embodiments of the present disclosure. An embodiment of the dual-polarized antenna port layout 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As shown in FIG. 18, the dual-polarized antenna port layout 1800 comprises a number of ports 1805, and a port layout and $(N_1, N_2)$ values 1810.

The supported numbers of antenna ports in Rel. 14 of LTE specification belong to {20, 24, 28, 32}, where both 1D and 2D antenna ports layouts can be supported. An illustration of 1D and 2D antenna port layouts and $(N_1, N_2)$ values for the agreed {20, 24, 28, 32} ports are shown in FIG. 18. Note that for $(N_1, N_2) = (4, 4)$ and $(O_1, O_2) = (8, 8)$, the number of bits to report the two PMI indices $(i_{1,1}, i_{1,2})$ and $i_2$ is 12, which together with RI and CQI bits implies that PUCCH format 3 alone may not enough to report all CSI components (as it may require 22 bits exceeding the 21 bit limit of PUCCH format 3). This invention addresses this issue and proposes to use a two PUCCH formats to report all CSI components.

In some embodiments, a set S of all CSI components includes the first PMI $i_1$ or $(i_{1,1}, i_{1,2})$, the second PMI, $i_2$, RI, CQI, CRI, and HARQ ACK/NACK.

In some embodiments, a UE is configured with PUCCH Format x to report a subset $S_1$ of all CSI components S in subframe or CSI reporting instance A0 (or subframes A0, A1, . . . ) and PUCCH Format y to report another subset $S_2$ of all CSI components Sin subframe or CSI reporting instance B0 (or subframes B0, B1, . . . ), where x and y belong to {1a, 1b, 2, 2a, 2b, 3, 4, 5, new format numbers}, and the x and y may or may not be the same, where $S_1$ and $S_2$ may or may not have a common component, and their union may or may not equal 5, and where A0, A1, . . . , and B0, B1, . . . are all different subframes. A few examples of CSI reporting in two sets $S_1$ and $S_2$ on PUCCH Format x and y, respectively are shown in TABLE 9.

TABLE 9

| Example | First CSI subset: $S_1$ reported using PUCCH Format x in subframe A0 or subframes (A0, A1, . . . ) | Second CSI subset: $S_2$ reported on PUCCH Format y in subframe B0 or subframes (B0, B1, . . . ) |
|---|---|---|
| 1a | $i_1$ or $(i_{1,1}, i_{1,2})$ | $i_2$, RI, CQI |
| 1b | $i_1$ or $(i_{1,1}, i_{1,2})$, RI | $i_2$, CQI |
| 1c | $i_1$ or $(i_{1,1}, i_{1,2})$, $i_2$, CQI | RI |
| 2a | $i_1$ or $(i_{1,1}, i_{1,2})$ | $i_2$, RI, CQI, CRI |
| 2b | $i_1$ or $(i_{1,1}, i_{1,2})$, RI | $i_2$, CQI, CRI |
| 2c | $i_1$ or $(i_{1,1}, i_{1,2})$, $i_2$, CQI | RI, CRI |
| 2aa | $i_1$ or $(i_{1,1}, i_{1,2})$, CRI | $i_2$, RI, CQI |
| 2bb | $i_1$ or $(i_{1,1}, i_{1,2})$, RI, CRI | $i_2$, CQI |
| 2cc | $i_1$ or $(i_{1,1}, i_{1,2})$, $i_2$, CQI, CRI | RI |
| 3a | $i_1$ or $(i_{1,1}, i_{1,2})$ | $i_2$, RI, CQI, HARQ ACK/NACK |
| 3b | $i_1$ or $(i_{1,1}, i_{1,2})$, RI | $i_2$, CQI, HARQ ACK/NACK |
| 3c | $i_1$ or $(i_{1,1}, i_{1,2})$, $i_2$, CQI | RI, HARQ ACK/NACK |
| 3aa | $i_1$ or $(i_{1,1}, i_{1,2})$, HARQ ACK/NACK | $i_2$, RI, CQI |
| 3bb | $i_1$ or $(i_{1,1}, i_{1,2})$, RI, HARQ ACK/NACK | $i_2$, CQI |
| 3cc | $i_1$ or $(i_{1,1}, i_{1,2})$, $i_2$, CQI, HARQ ACK/NACK | RI |

Using the PUCCH formats defined in the LTE specification, combinations of UCI on PUCCH are supported. In one example, Format 2 for up to 11 bits corresponding to a CSI report is supported when not multiplexed with HARQ-ACK. In another example, Format 2a for up to 11 bits corresponding to a CSI report multiplexed with 1-bit HARQ-ACK for normal cyclic prefix is supported. In yet another example, Format 2b for up to 11 bits corresponding to a CSI report multiplexed with 2-bit HARQ-ACK for normal cyclic prefix is supported. In yet another example, Format 2 for up to 11 bits corresponding to a CSI report multiplexed with HARQ-ACK for extended cyclic prefix is supported.

In yet another example, Format 3 for more than 11 bits corresponding to a CSI report when not multiplexed with HARQ-ACK is supported. In yet another example, Format 3 for more than 11 bits corresponding to a CSI report when multiplexed with 1-bit or 2-bit HARQ-ACK is supported. In yet another example, Format 3a for more than 11 bits corresponding to a CSI report multiplexed with 1-bit HARQ-ACK for normal cyclic prefix is supported. In yet another example, Format 3b for more than 11 bits corresponding to a CSI report multiplexed with 2-bit HARQ-ACK for normal cyclic prefix is supported.

In yet another example, Format 3 regardless of the payload size of a CSI report when not multiplexed with HARQ-ACK is supported. In yet another example, Format 3 regardless of the payload size of a CSI report when multiplexed with 1-bit or 2-bit HARQ-ACK is supported. In yet another example, Format 3a regardless of the payload size of a CSI report when multiplexed with 1-bit HARQ-ACK for normal cyclic prefix is supported. In yet another example, Format 3b regardless of the payload size of a CSI report when multiplexed with 2-bit HARQ-ACK for normal cyclic prefix is supported.

In yet another example, Format 4 for more than 11 bits corresponding to a CSI report is supported. In yet another example, Format 4 for more than 22 bits corresponding to a CSI report is supported. In yet another example, Format 4 regardless of the payload size of a CSI report is supported. In yet another example, Format 5 for more than 11 bits corresponding to a CSI report is supported. In yet another example, Format 5 for more than 22 bits corresponding to a CSI report is supported. In yet another example, Format 5 regardless of the payload size of a CSI report is supported.

A CSI report can correspond to either a first CSI subset or a second CSI subset. A few examples of two CSI subsets are shown in TABLE 9, which differ in their content. For instance, Example 1a corresponds to the case in which the first subset contains $i_1$ or $(i_{1,1}, i_{1,2})$ and the second subset contains $i_2$, RI, CQI. Other examples are similarly formulated.

In some embodiments, using the PUCCH formats defined in the LTE specification, Combinations of UCI on PUCCH are supported. In one example, Format 2 for up to 11 bits corresponding to a first (subset or component of) CSI report is supported when not multiplexed with HARQ-ACK and Format 2 for up to 11 bits corresponding to a second (subset or component of) CSI report is supported when not multiplexed with HARQ-ACK. In yet another example, Format 2a for up to 11 bits corresponding to a first (subset or component of) CSI report multiplexed with 1-bit HARQ-ACK for normal cyclic prefix is supported and Format 2a for up to 11 bits corresponding to a second (subset or component of) CSI report multiplexed with 1-bit HARQ-ACK for normal cyclic prefix is supported.

In yet another example, Format 2b for up to 11 bits corresponding to a first (subset or component of) CSI report multiplexed with 2-bit HARQ-ACK for normal cyclic prefix is supported and Format 2b for up to 11 bits corresponding to a second (subset or component of) CSI report multiplexed with 2-bit HARQ-ACK for normal cyclic prefix is supported. In yet another example, Format 2 for up to 11 bits corresponding to a first (subset or component of) CSI report multiplexed with HARQ-ACK for extended cyclic prefix is supported and Format 2 for up to 11 bits corresponding to a second (subset or component of) CSI report multiplexed with HARQ-ACK for extended cyclic prefix is supported.

In yet another example, Format 2 for up to 11 bits corresponding to a first (subset or component of) CSI report is supported when not multiplexed with HARQ-ACK and Format 2a for up to 11 bits corresponding to a second (subset or component of) CSI report is supported when multiplexed with 1-bit HARQ-ACK for normal cyclic prefix. In yet another example, Format 2 for up to 11 bits corresponding to a first (subset or component of) CSI report is supported when not multiplexed with HARQ-ACK and Format 2b for up to 11 bits corresponding to a second (subset or component of) CSI report is supported when multiplexed with 2-bit HARQ-ACK for normal cyclic prefix.

In yet another example, Format 2a for up to 11 bits corresponding to a first (subset or component of) CSI report is supported when multiplexed with 1-bit HARQ-ACK for normal cyclic prefix and Format 2 for up to 11 bits corresponding to a second (subset or component of) CSI report is supported when not multiplexed with HARQ-ACK. In yet another example, Format 2b for up to 11 bits corresponding to a first (subset or component of) CSI report is supported when multiplexed with 2-bit HARQ-ACK for normal cyclic prefix and Format 2 for up to 11 bits corresponding to a second (subset or component of) CSI report is supported when not multiplexed with HARQ-ACK.

In yet another example, Format 2a for up to 11 bits corresponding to a first (subset or component of) CSI report multiplexed with 2-bit HARQ-ACK for normal cyclic prefix is supported and Format 2b for up to 11 bits corresponding to a second (subset or component of) CSI report is supported when multiplexed with 2-bit HARQ-ACK for normal cyclic prefix. In yet another example, Format 2b for up to 11 bits corresponding to a first (subset or component of) CSI report multiplexed with 2-bit HARQ-ACK for normal cyclic prefix is supported and Format 2a for up to 11 bits corresponding to a second (subset or component of) CSI report is supported when multiplexed with 1-bit HARQ-ACK for normal cyclic prefix.

In yet another example, Format 2 for up to 11 bits corresponding to a first (subset or component of) CSI report is supported when not multiplexed with HARQ-ACK and Format 3 for more than 11 bits corresponding to a second (subset or component of) CSI report is supported when not multiplexed with HARQ-ACK. In yet another example, Format 2a for up to 11 bits corresponding to a first (subset or component of) CSI report when multiplexed with 1-bit HARQ-ACK for normal cyclic prefix is supported and Format 3 for more than 11 bits corresponding to a second (subset or component of) CSI report is supported when not multiplexed with HARQ-ACK.

In yet another example, Format 2b for up to 11 bits corresponding to a first (subset or component of) CSI report is supported when multiplexed with 2-bit HARQ-ACK for normal cyclic prefix and Format 3 for more than 11 bits corresponding to a second (subset or component of) CSI report is supported when not multiplexed with HARQ-ACK. In yet another example, Format 2 for up to 11 bits corresponding to a first (subset or component of) CSI report multiplexed with HARQ-ACK for extended cyclic prefix is supported and Format 3 for more than 11 bits corresponding to a second (subset or component of) CSI report when not multiplexed with HARQ-ACK is supported In yet another example, Format 2 for up to 11 bits corresponding to a first (subset or component of) CSI report is supported when not multiplexed with HARQ-ACK and Format 3a for more than 11 bits corresponding to a second (subset or component of) CSI report is supported when multiplexed with 1-bit HARQ-ACK for normal cyclic prefix.

In yet another example, Format 2 for up to 11 bits corresponding to a first (subset or component of) CSI report when not multiplexed with HARQ-ACK is supported and Format 3b for more than 11 bits corresponding to a second (subset or component of) CSI report is supported when multiplexed with 2-bit HARQ-ACK for normal cyclic prefix.

In some embodiments, the supported UCI on PUCCH that are aforementioned are based on conditions other than the number of CSI bits (11 bits) according to the aforementioned embodiments of the present disclosure.

In some embodiments, a UE is configured to report two subsets of CSI components, $S_1$ and $S_2$. In one example, the $S_1$ comprises RI and ($i_2$, CQI), and is configured to be reported using PUCCH Format 2 at least one of jointly in subframe A0 or separately in two subframes (A0, A1), respectively. In another example, the $S_2$ comprises $i_1$ or ($i_{1,1}$, $i_{1,2}$), and is configured to be reported in subframe B0 that is different from subframe A0 or (A0, A1), according to at least one of Configuration 0 that $i_1$ or ($i_{1,1}$, $i_{1,2}$) is reported using PUCCH Format 2 or Configuration 1 that is $i_1$ or ($i_{1,1}$, $i_{1,2}$) is reported using PUCCH Format 3.

The UE is configured with Configuration 0 or 1. In some embodiments of configuration scheme 0, the UE is pre-configured with a default configuration such as Configuration 1. In some embodiments of Configuration scheme 1, the UE is configured always with Configuration 0 for a legacy UE and with Configuration 1, and beyond UE. In some embodiments of Configuration scheme 2, the UE is configured with one of the two configurations depending on the number of bits needed to report $i_1$ or ($i_{1,1}$, $i_{1,2}$). In one example of Example 0, the UE is configured with Configuration 0 if the number of bits needed to report $i_1$ or ($i_{1,1}$, $i_{1,2}$) is ≤p, and is configured with Configuration 1 if the number of bits needed to report $i_1$ or ($i_{1,1}$, $i_{1,2}$) is >p. An example value of p=11.

In some embodiments of Configuration scheme 3, the UE is configured with one of the two configurations depending on the configured codebook. For instance, the UE is configured with higher layer parameter eMIMO-Type, and eMIMO-Type is set to 'CLASS A', which means that the UE configured with a Class A codebook, and the corresponding codebook parameters are $N_1$, $N_2$, $O_1$, and $O_2$, and Config are configured with the higher-layer parameters codebook-Config-N1, codebook-Config-N2, codebook-Over-Sampling-RateConfig-O1, codebook-Over-Sampling-RateConfig-O2, and codebook-Config respectively. In one example of Example 1 (based on Codebook-Config), the UE is configured with Configuration 0 if the Codebook-Config=2, 3, 4, and is configured with Configuration 1 if Codebook-Config=1.

In some embodiments of Example 2 (based on ($O_1$, $O_2$)), the UE is configured with Configuration 1 if at least one of the following conditions on ($O_1$, $O_2$) is satisfied, and is configured with Configuration 0 otherwise. In such example, Configuration Condition 0 is determined by ($O_1$, $O_2$)=(p, q), for example p=q=8. In such example, Configuration Condition 1 is determined by min($O_1$, $O_2$)≥p, for example p=8. In such example, Configuration Condition 2 is determined by $O_1 O_2$≥p, for example p=64. In such example, Configuration Condition 3 is determined by a combination of Condition 0-2, where a combination includes 'AND' and 'OR' operations.

In some embodiments of Example 3 (based on ($N_1$, $N_2$)), the UE is configured with Configuration 1 if at least one of the following conditions on ($N_1$, $N_2$) is satisfied, and is configured with Configuration 0 otherwise. In such embodiments, Configuration Condition 4 is determined by ($N_1$, $N_2$)=(p, q), for example p=q=4. In such embodiments, Configuration Condition 5 is determined by min($N_1$, $N_2$)≥p, for example p=4. In such embodiments, Configuration Condition 6 is determined by $N_1 N_2$≥p, for example p=16. In such embodiments, Configuration Condition 7 is determined by a combination of Condition 4-6, where a combination includes 'AND' and 'OR' operations.

In some embodiments of Example 4 (based on ($O_1$, $O_2$) and ($N_1$, $N_2$)), the UE is configured with Configuration 1 if at least one of the following conditions on ($O_1$, $O_2$) and ($N_1$, $N_2$) is satisfied, and is configured with Configuration 0 otherwise. In such embodiments, Configuration Condition 8 is determined by a Condition C1 or/and C2, where C1∈{Condition 0-3} and C2∈{Condition 4-7}. In such embodiments, Configuration Condition 9 is determined by min($N_1 O_1$, $N_2 O_2$)≥p, for example p=32. In such embodiments, Configuration Condition 10 is determined by $N_1 O_1 N_2 O_2 > 2^p$ or $\log_2 \lceil N_1 O_1 N_2 O_2 \rceil$>p or $\log_2 \lceil N_1 O_1 \rceil + \log_2 \lceil N_2 O_2 \rceil$>p, for example p=11. In such embodiments, Configuration Condition 11 is determined by a combination of Condition 8-10, where a combination includes 'AND' and 'OR' operations.

In some embodiments of Example 5 (based on ($O_1$, $O_2$), ($N_1$, $N_2$), and beam group spacing parameters ($s_1$, $s_2$)), the UE is configured with Configuration 1 if at least one of the following conditions on ($O_1$, $O_2$), ($N_1$, $N_2$) and ($s_1$, $s_2$) is satisfied, and is configured with Configuration 0 otherwise, where ($s_1$, $s_2$) parameters depends on rank and Codebook-Config as shown in TABLE 10. In such embodiments, Configuration Condition 12 is determined by min($N_1 O_1/s_1$, $N_2 O_2/s_2$)≥p, for rank r, for example p=32, and r=1 or r=1-8. In such embodiments, Configuration Condition 13 is determined by $N_1 O_1 N_2 O_2 / s_1 / s_2 > 2^p$ or $$\log_2 \left\lceil \frac{N_1 O_1 N_2 O_2}{s_1 s_2} \right\rceil > p \text{ or } \log_2 \left\lceil \frac{N_1 O_1}{s_1} \right\rceil + \log_2 \left\lceil \frac{N_2 O_2}{s_2} \right\rceil > p$$

for example p=11, and r=1 or r=1-8. In such embodiments, Configuration Condition 14 is determined for rank r, for example r=1 or r=1-8. In one example, if $$r \neq 3\text{-}4, N_1 O_1 N_2 O_2 / s_1 / s_2 > 2^p \text{ or}$$
$$\log_2 \left\lceil \frac{N_1 O_1 N_2 O_2}{s_1 s_2} \right\rceil > p \text{ or } \log_2 \left\lceil \frac{N_1 O_1}{s_1} \right\rceil + \log_2 \left\lceil \frac{N_2 O_2}{s_2} \right\rceil > p.$$

In another example, if $$r = 3\text{-}4, N_1 O_1 N_2 O_2 / s_1 / s_2 > 2^{p-d} \text{ or}$$
$$\log_2 \left\lceil \frac{N_1 O_1 N_2 O_2}{s_1 s_2} \right\rceil > p - d \text{ or}$$
$$\log_2 \left\lceil \frac{N_1 O_1}{s_1} \right\rceil + \log_2 \left\lceil \frac{N_2 O_2}{s_2} \right\rceil > p - d,$$

where an example value of p and d is 11 and $$\left\lfloor \frac{7 - N_2}{3} \right\rfloor,$$

respectively. In such embodiments, Configuration Condition 15 is determined by a combination of Condition 12-14, where a combination includes 'AND' and 'OR' operations.

TABLE 10

|  | Rank 1 | Rank 2 | Rank 3 | Rank 4 | Rank 5 | Rank 6 | Rank 7 | Rank 8 |
|---|---|---|---|---|---|---|---|---|
| Codebook-Config 1 | (1, 1) | (1, 1) | (1, 1) | (1, 1) | (1, 1) | (1, 1) | (1, 1) | (1, 1) |
| Codebook-Config 2 | (2, 2) | (2, 2) | $\left(\frac{O_1}{2}, \frac{O_2}{2}\right)$ | $\left(\frac{O_1}{2}, \frac{O_2}{2}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ |
| Codebook-Config 3 | (2, 2) | (2, 2) | $\left(O_1, \frac{O_2}{2}\right)$ | $\left(O_1, \frac{O_2}{2}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ |
| Codebook-Config 4 | (2, 2) | (2, 2) | $\left(O_1, \frac{O_2}{4}\right)$ | $\left(O_1, \frac{O_2}{4}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ | $\left(\frac{O_1}{4}, \frac{O_2}{4}\right)$ |

In some embodiments of Example 6, based on a combination of Examples 1-5, Configuration scheme 4 is determined by a combination of schemes 0-3.

The example values of parameters p, q, r, and d in the aforementioned schemes are exemplary. The aforementioned schemes are general and applicable to any arbitrary values for these parameters.

In some embodiments, the UE is configured to report two subsets of CSI components, $S_1$ and $S_2$. In one example, the $S_1$ comprises ($i_2$, CQI), and is configured to be reported using PUCCH Format 2 in subframe A0. In another example, the $S_2$ comprises $i_1$ or ($i_{1,1}$, $i_{1,2}$) and RI, and is configured to be reported at least one of jointly in subframe B0 or separately in subframes (B0, B1), respectively. In such example, B0 and/or B1 are/is different from subframe A0, according to at least one of Configuration 2 that is determined by $i_1$ or ($i_{1,1}$, $i_{1,2}$) and RI that are reported using PUCCH Format 2, or Configuration 3 that is determined by $i_1$ or ($i_{1,1}$, $i_{1,2}$) and RI are reported using PUCCH Format 3.

The UE is configured with Configuration 2 or 3 based on at least one of the abovementioned embodiments. The values of parameters p, q, r, and d in the aforementioned embodiments are appropriately selected. For example, the values of p, q, r, and d are smaller than the example values above if RI is jointly reported with $i_1$ or ($i_{1,1}$, $i_{1,2}$).

In some embodiments, a UE is configured to report two subsets of CSI components, $S_1$ and $S_2$. In such embodiments, the $S_1$ comprises RI, and is configured to be reported using PUCCH Format 2 in subframe A0. In such embodiments, the $S_2$ comprises $i_1$ or ($i_{1,1}$, $i_{1,2}$) and ($i_2$, CQI), and is configured to be reported at least one of jointly in subframe B0 or separately in subframes (B0,B1), respectively. In such embodiments, the B0 and/or B1 that are/is different from subframe A0, according to at least one of Configuration 4 that is determined by $i_1$ or ($i_{1,1}$, $i_{1,2}$) and RI are reported using PUCCH Format 2, or Configuration 5 that is determined by $i_1$ or ($i_{1,1}$, $i_{1,2}$) and RI are reported using PUCCH Format 3.

The UE is configured with Configuration 4 or 5 based on at least one of the abovementioned embodiments. The values of parameters p, q, r, and d in the aforementioned embodiments are appropriately selected. For example, the values of p, q, r, and d are smaller than the example values above if ($i_2$, CQI) is jointly reported with $i_1$ or ($i_{1,1}$, $i_{1,2}$).

In some embodiments, a transmission of CQI, RI, and PMI (or PMIs $i_1$ or ($i_{1,1}$, $i_{1,2}$) and $i_2$) has different period from the transmission of CRI. It is, however, possible that CRI is transmitted simultaneously with a subset of CQI, RI, and PMI within a same subframe. The following alternative embodiments are proposed to support simultaneous transmission of CRI with a subset of CQI, RI, and PMI.

In some embodiments, a UE is configured to report two subsets of CSI components, $S_1$ and $S_2$. In such embodiments, the $S_1$ comprises CRI, RI, and ($i_2$, CQI), and is configured to be reported using PUCCH Format 2 or at least one of jointly in subframe A0 or separately in at least two subframes (A0,A1), respectively, where CRI is reported jointly with at least one of RI and ($i_2$, CQI). In such embodiments, the $S_2$ comprises $i_1$ or ($i_{1,1}$, $i_{1,2}$), and is configured to be reported in subframe B0 that is/are different from subframe A0 or (A0,A1), according to at least one of Configuration 6 determined by $i_1$ or ($i_{1,1}$, $i_{1,2}$) that is reported using PUCCH Format 2, or Configuration 7 determined by $i_1$ or ($i_{1,1}$, $i_{1,2}$) that is reported using PUCCH Format 3.

In some embodiments, a UE is configured to report two subsets of CSI components, $S_1$ and $S_2$. In such embodiments, the $S_1$ comprises CRI and ($i_2$, CQI), and is configured to be reported using PUCCH Format 2 at least one of jointly in subframe A0 or separately in two subframes (A0, A1), respectively. In such embodiments, the $S_2$ comprises $i_1$ or ($i_{1,1}$, $i_{1,2}$) and RI, and is configured to be reported at least one of jointly in subframe B0 or separately in subframes (B0, B1), respectively. In such embodiments, B0 and/or B1 that are/is different from subframe A0 or (A0, A1), according to at least one of Configuration 8 determined by $i_1$ or ($i_{1,1}$, $i_{1,2}$) and RI are reported using PUCCH Format 2 or Configuration 9 determined by $i_1$ or ($i_{1,1}$, $i_{1,2}$) and RI are reported using PUCCH Format 3.

In some embodiments, a UE is configured to report two subsets of CSI components, $S_1$ and $S_2$. In such embodiments, the $S_1$ comprises CRI and RI, and is configured to be reported using PUCCH Format 2 at least one jointly in subframe A0 or separately in two subframes (A0, A1), respectively. In such embodiments, the $S_2$ comprises $i_1$ or ($i_{1,1}$, $i_{1,2}$) and ($i_2$, CQI), and is configured to be reported at least one of jointly in subframe B0 or separately in subframes (B0,B1), respectively. In such embodiments, B0 and/or B1 that is/are different from subframe A0 or (A0,A1) according to at least one of Configuration 10 determined by $i_1$ or ($i_{1,1}$, $i_{1,2}$) and RI are reported using PUCCH Format 2 or Configuration 11 determined by $i_1$ or ($i_{1,1}$, $i_{1,2}$) and RI are reported using PUCCH Format 3.

In some embodiments, a UE is configured to report two subsets of CSI components, $S_1$ and $S_2$. In such embodiments, the $S_1$ comprises RI and ($i_2$, CQI), and is configured to be reported using PUCCH Format 2 at least one of jointly in subframe A0 or separately in two subframes (A0, A1), respectively. In such embodiments, the $S_2$ comprises of CRI and $i_1$ or ($i_{1,1}$, $i_{1,2}$), and is configured to be reported at least one of jointly in subframe B0 or separately in two subframes (B0, B1), respectively. In such embodiments, Bo and/or B1 are/is different from subframe A0 or (A0,A1) according to at least one of Configuration 12 determined by CRI and $i_1$ or $(i_{1,1}, i_{1,2})$ are reported using PUCCH Format 2 or Configuration 13 determined by CRI and $i_1$ or $(i_{1,1}, i_{1,2})$ are reported using PUCCH Format 3.

In some embodiments, a UE is configured to report two subsets of CSI components, $S_1$ and $S_2$. In such embodiments, the $S_1$ comprises $(i_2, CQI)$, and is configured to be reported using PUCCH Format 2 in subframe A0 and the $S_2$ comprises $i_1$ or $(i_{1,1}, i_{1,2})$, RI and CRI, and is configured to be reported at least one of jointly in subframe B0 or separately in at least two subframes (B0, B1), respectively, where CRI is reported jointly with at least one of $i_1$ or $(i_{1,1}, i_{1,2})$ and RI. In such embodiments, B0 and/or B1 are/is different from subframe A0, according to at least one of Configuration 14 determined by $i_1$ or $(i_{1,1}, i_{1,2})$, RI, and CRI are reported using PUCCH Format 2 or Configuration 15 determined by $i_1$ or $(i_{1,1}, i_{1,2})$, RI, and CRI are reported using PUCCH Format 3.

In some embodiments, a UE is configured to report two subsets of CSI components, $S_1$ and $S_2$. The $S_1$ comprises RI, and is configured to be reported using PUCCH Format 2 in subframe A0 and the $S_2$ comprises $i_1$ or $(i_{1,1}, i_{1,2})$, $(i_2, CQI)$, and CRI, and is configured to be reported at least one of jointly in subframe B0 or separately in at least two subframes (B0, B1), respectively, where CRI is reported jointly with at least one of $i_1$ or $(i_{1,1}, i_{1,2})$ and $(i_2, CQI)$. In such embodiments, B0 and/or B1 are/is different from subframe A0 according to at least one of Configuration 16 determined by $i_1$ or $(i_{1,1}, i_{1,2})$, $(i_2, CQI)$, and CRI are reported using PUCCH Format 2 or Configuration 17 determined by $i_1$ or $(i_{1,1}, i_{1,2})$, $(i_2, CQI)$, and CRI are reported using PUCCH Format 3.

Figure 19:
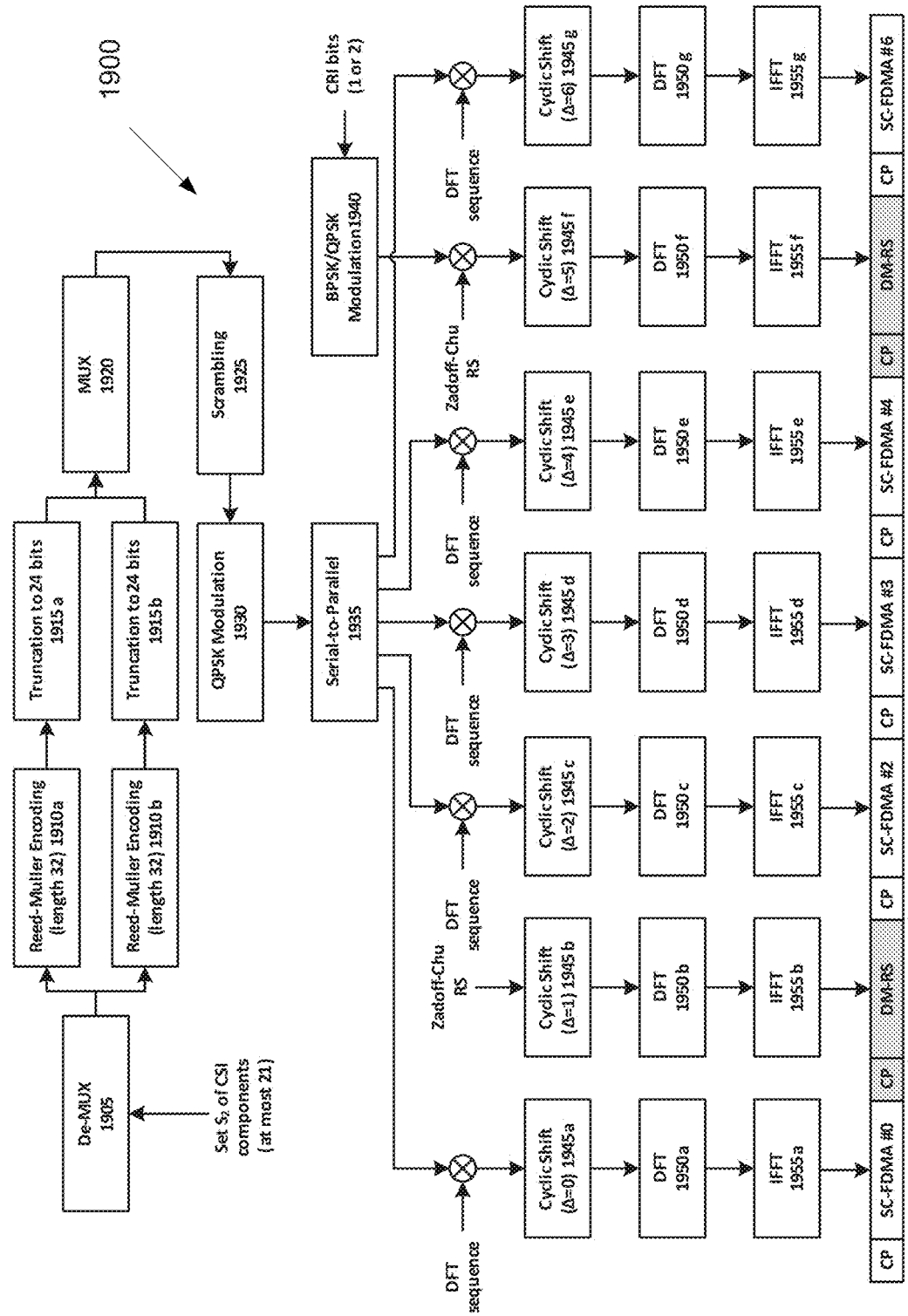
FIG. 19 illustrates an example modified PUCCH format 3 for simultaneous transmission of CSI-resource index (CRI) and CSI according to embodiments of the present disclosure.

FIG. 19 illustrates an example modified PUCCH format 3 for simultaneous transmission of CRI and CSI according to embodiments of the present disclosure. An embodiment of the PUCCH format 3 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As shown in FIG. 19, the PUCCH format 3 1900 comprises a DeMUX block 1905, a plurality of Reed-Muller encoding blocks 1910*a* and 1910*b*, a plurality of truncation to 24 bit blocks 1915*a* and 1915*b*, a MUX block 1920, a scrambling block 1925, a QPSK modulation block 1930, a serial-to-parallel block 1935, a BPSK/QPSK modulation block 1940, a plurality of cyclic shift blocks 1945*a*-1945*g*, a plurality of DFT blocks 1950*a*-1950*g*, and a plurality of IFFT blocks 1955*a*-1955*g*.

In some embodiments, if a number of bits to report CRI is no more than 2 bits, then a UE is configured to report CRI separately from CQI, RI, and PMI, by modulating the number of bits into one of the RS signals in at least one of PUCCH Format 2a/2b (as shown in FIG. 14) or a newly defined PUCCH Format 3a/3b (as shown in FIG. 19) depending on whether CRI is reported together with the first set $S_1$ of CSI components (which is reported using PUCCH Format 2a/2b) or it is reported together with the second set $S_2$ of CSI components (which is reported using PUCCH Format 2a/2b or 3a/3b).

In some embodiments, the aforementioned embodiments can be straightforwardly modified to define new Configuration parameters. In one example, Format 2 and Format 3 may be replaced with Format 2a/2b and Format 3a/3b, respectively. If the number of bits to report CRI is more than 2 bits, then the UE is configured to report CRI jointly with CQI, RI, and PMI according to the aforementioned embodiments of the present disclosure.

In some embodiments, a simultaneous transmission of the two sets of CSI components $S_1$ and $S_2$, and HARQ ACK/NACK can be enabled by UE-specific higher layer signaling. In subframes where simultaneous transmission is enabled, the two sets of CSI components $S_1$ and $S_2$, and the 1 or 2 bits HARQ ACK/NACK need to be multiplexed.

In some embodiments, a UE is configured to report HARQ ACK/NACK simultaneously with the two sets of CSI components $S_1$ and $S_2$, by modulation using one of the RS signals in either PUCCH Format 2a/2b (as shown in FIG. 14) or newly defined PUCCH Format 3a/3b as shown in FIG. 19 depending on whether HARQ ACK/NACK is reported together with the first set $S_1$ of CSI components (which is reported using PUCCH Format 2a/2b) or it is reported together with the second set $S_2$ of CSI components (which is reported using PUCCH Format 2a/2b or 3a/3b depending on the Configuration).

In some embodiments, some of the aforementioned embodiments can be straightforwardly modified to define new Configuration parameters in this case, by replacing Format 2 and Format 3 with Format 2a/2b and Format 3a/3b, respectively.

In Rel. 13 of the LTE specification, two types of CSI-RS resources, namely NP and BF, and two types of CSI reporting or eMIMO-Type, namely, Class A and Class B, are supported, and a UE can be configured with at least one of NP CSI-RS resource associated with Class A eMIMO-Type, (K=1) BF CSI-RS resource associated with Class B eMIMO-Type (with no CSI reporting), or (K>1) BF CSI-RS resources associated with Class B eMIMO-Type with or without CRI reporting.

In some embodiments, a UE is configured with a "hybrid CSI feedback scheme" in which the UE is configured with a "hybrid CSI-RS resource" comprising of two CSI-RS resources (or CSI-RS resource configurations), each resource associated with an eMIMO-Type. This eMIMO-Type is signaled to the UE via higher-layer (RRC) signaling. Examples of eMIMO-Type, as previously described, are 'CLASS A' ('nonPrecoded'), 'CLASS B' ('beamformed'), or a new type such as 'CLASS B-2' or 'CLASS C'. In such embodiments, the first CSI-RS resource (or CSI-RS resource configuration) is associated with at least one of Class A eMIMO-Type in which NP CSI-RS is transmitted from all $2N_1N_2$ ports, Class C eMIMO-Type in which NP CSI-RS is transmitted from a subset of $2N_1N_2$ ports, for example one subarray of antenna ports, or Class B-2 eMIMO-Type in which BF CSI-RS is transmitted from K>1 BF ports. In such embodiments, the second CSI-RS resource (or CSI-RS resource configuration) is associated with eMIMO-Type of CLASS B with one CSI-RS resource (K=1) which is transmitted from beam-formed ports ($<2N_1N_2$) that may be beam-formed using the beamforming weights obtained using the first CSI-RS. The two CSI-RS resources are further configured to be associated with at least one of a single CSI process in which the two CSI reports are calculated independently or dependently and are reported according to a (e.g., single) reporting configuration or two CSI processes in which the two CSI reports are calculated independently and are reported according to two reporting configurations.

In some embodiments, a UE is configured to report two CSI reports, $S_1$ and $S_2$. The first CSI report $S_1$ comprises of RI and $i_1$ or ($i_{1,1}$, $i_{1,2}$), and is configured to be reported at least one of jointly in subframe A0 or separately in two subframes (A0, A1), respectively, according to at least one of Configuration 18 determined by RI and $i_1$ or ($i_{1,1}$, $i_{1,2}$) are reported using PUCCH Format 2, or Configuration 19 determined by RI and $i_1$ or ($i_{1,1}$, $i_{1,2}$) are reported using PUCCH Format 3. The second CSI report $S_2$ comprises ($i_2$, CQI), and is configured to be reported using PUCCH Format 2 in subframe A0 that is different from A0 or (A0, A1).

In some embodiments, a UE is configured to report two CSI reports, $S_1$ and $S_2$. In such embodiments, the first CSI report $S_1$ comprises $i_1$ or ($i_{1,1}$, $i_{1,2}$), and is configured to be reported in subframe A0 according to at least one of Configuration 20 determined by $i_1$ or ($i_{1,1}$, $i_{1,2}$) is reported using PUCCH Format 2 or Configuration 21 determined by $i_1$ or ($i_{1,1}$, $i_{1,2}$) is reported using PUCCH Format 3. In such embodiments, the second CSI report $S_2$ comprises RI and ($i_2$, CQI), and is configured to be reported using PUCCH Format 2 at least one of jointly in subframe B0 or separately in two subframes (B0, B1), respectively. In such embodiments, B0 and/or B1 are/is different from A0.

In some embodiments, a UE is configured to report two CSI reports, $S_1$ and $S_2$. In such embodiments, the first CSI report $S_1$ comprises RI and $i_1$ or ($i_{1,1}$, $i_{1,2}$), and is configured to be reported either jointly in subframe A0 or separately in two subframes (A0, A1), respectively, and according to at least one of Configuration 22 determined by RI and $i_1$ or ($i_{1,1}$, $i_{1,2}$) are reported using PUCCH Format 2 or Configuration 23 determined by RI and $i_1$ or ($i_{1,1}$, $i_{1,2}$) are reported using PUCCH Format 3. In such embodiments, the second CSI report $S_2$ comprises RI and ($i_2$, CQI), and is configured to be reported using PUCCH Format 2 either jointly in subframe B0 or separately in two subframes (B0, B1), respectively. In such embodiments, B0 and/or B1 are/is different from A0 or (A0, A1). The RIs in two CSI reports are derived independently or dependently using the first and second CSI-RS resources, respectively.

In some embodiments, a UE is configured to report two CSI reports, $S_1$ and $S_2$. In such embodiments, the first CSI report $S_1$ comprises RI and $i_1$ or ($i_{1,1}$, $i_{1,2}$), and is configured to be reported either jointly in subframe A0 or separately in two subframes (A0, A1), respectively, and according to at least one of Configuration 24 determine by RI and $i_1$ or ($i_{1,1}$, $i_{1,2}$) is reported using PUCCH Format 2 or Configuration 25 determined by RI and $i_1$ or ($i_{1,1}$, $i_{1,2}$) is reported using PUCCH Format 3. In such embodiments, the second CSI report $S_2$ comprises RI and ($i_2$, CQI), and is configured to be reported using PUCCH Format 2 either jointly in subframe B0 or separately in two subframes (B0, B1), respectively. In such embodiments, B0 and/or B1 are/is different from A0 or (A0, A1).

In some embodiments, a UE is configured to report two CSI reports, $S_1$ and S. In such embodiments, the first CSI report $S_1$ comprises two or all of RI, ($i_2$, CQI), and $i_1$ or ($i_{1,1}$, $i_{1,2}$), where which two includes $i_1$ or ($i_{1,1}$, $i_{1,2}$) and is configured to the UE. The first CSI report is configured to be reported either jointly in subframe A0 or separately in two subframes (A0, A1) or three subframes (A0, A1, A2), respectively, and according to at least one of Configuration 26 that is configured with two or all of RI, ($i_2$, CQI), and $i_1$ or ($i_{1,1}$, $i_{1,2}$) is reported using PUCCH Format 2, or Configuration 27 that is configured with two or all of RI, ($i_2$, CQI), and $i_1$ or ($i_{1,1}$, $i_{1,2}$) is reported using PUCCH Format 3. In such embodiments, the second CSI report $S_2$ comprises one or both of RI and ($i_2$, CQI), where which one is configured to the UE. The second CSI report is configured to be reported using PUCCH Format 2 either jointly in subframe B0 or separately in two subframes (B0,B1), respectively, In such embodiments, B0 and/or B1 are/is different from A0 or (A0, A1) or (A0, A1, A2). The RIs and ($i_2$, CQI)s in two CSI reports are derived independently or dependently using the first and second CSI-RS resources, respectively.

In some embodiments, a UE is configured to report two CSI reports, $S_1$ and $S_2$. In such embodiments, the first CSI report $S_1$ comprises one or two or all of RI, ($i_2$, CQI), and $i_1$ or ($i_{1,1}$, $i_{1,2}$), where which one or two includes $i_1$ or ($i_{1,1}$, $i_{1,2}$) and is configured to the UE. The first CSI report is configured to be reported either jointly in subframe A0 or separately in two subframes (A0, A1) or three subframes (A0, A1, A2), respectively, and according to at least one of Configuration 28 that is configured with one or two or all of RI, ($i_2$, CQI), and $i_1$ or ($i_{1,1}$, $i_{1,2}$) is reported using PUCCH Format 2, or Configuration 29 that is configured with one or two or all of RI ($i_2$, CQI), and $i_1$ or ($i_{1,1}$, $i_{1,2}$) is reported using PUCCH Format 3. In such embodiments, the second CSI report $S_2$ comprises one or two or all of RI, ($i_2$, CQI), and $i_1$ or ($i_{1,1}$, $i_{1,2}$), where which one or two is configured to the UE. The second CSI report is configured to be reported using PUCCH Format 2 either jointly in subframe B0 or separately in two subframes (B0, B1) or three subframes (B0, B1, B2), respectively. In such embodiments, B0 and/or B1 are/is different from A0 or (A0, A1) or (A0, A1, A2). The RIs, ($i_2$, CQI)s, $i_1$s or ($i_{1,1}$, $i_{1,2}$)s in two CSI reports are derived independently or dependently using the first and second CSI-RS resources, respectively.

In some embodiments, two CSI components or reports, $S_1$ and $S_2$, are configured to be reported according to at least one of PUCCH Format 1 and Format 2, PUCCH Format 1 and Format 3, PUCCH Format 1 and Format 4, PUCCH Format 1 and Format 5, PUCCH Format 2 and Format 2, PUCCH Format 2 and Format 3, PUCCH Format 2 and Format 4, PUCCH Format 2 and Format 5, PUCCH Format 3 and Format 4, PUCCH Format 3 and Format 5, or PUCCH Format 4 and Format 5. Furthermore, PUCCH Format x and Format y, where x and y denote one of combination of the aforementioned embodiments, are respectively mapped to either $S_1$ and $S_2$ or $S_2$ and $S_1$.

In some embodiments, a UE is configured with two PUCCH resources for PUCCH Format x and y, where x≠y, for two CSI subsets $S_1$ and $S_2$ via semi-static higher layer RRC signaling or dynamic signaling. In this case, the UE is also configured with periodicity and subframe offset of the two PUCCH CSI reporting. Since in a given CSI reporting instance, the UE will report one of the two CSI subsets, hence will use one of the two configured PUCCH formats, eNB can configure the PUCCH Format resource that is not being used in a given CSI reporting instance to other UE(s). For example, if the UE is configured with PUCCH Format 2 and 3 to report CSI subsets, and in given CSI reporting subframe the UE is using PUCCH Format 2 resource to report a CSI subset, then eNB can allocate the PUCCH Format 3 resource to other UE(s).

In some embodiments, the configuration condition, e.g., the number of CSI bits, for a CSI subset to get configured with one of two PUCCH formats, x and y, for periodic CSI reporting on PUCCH corresponds to multiple (x, y) combinations, for example (x, y)∈{(1, 3), (2, 2), (2, 3), (3, 3)}. In such cases, the UE selects one of multiple (x, y) combinations. In one example, the UE selects the combination with the minimum x+y. If there are multiple such combinations, then the UE selects the combination with the minimum absolute difference |x−y|. For example, if the set of possible combinations is {(1, 3), (2, 2), (2, 3), (3, 3)}, then there are two combinations (1, 3) and (2, 2) with the minimum x+y=4. Between the two, (2, 2) has the minimum absolute difference |x−y|=0. The UE therefore selects (2, 2) for the CSI reporting. In another example, the UE selects the combination with the minimum absolute difference |x−y|. If there are multiple such combinations, then the UE selects the combination with the minimum x+y. For example, if the set of possible combinations is {(1, 3), (2, 2), (2, 3), (3, 3)}, then there are two combinations (2, 2) and (3, 3) with the minimum absolute difference |x−y|=0. Between the two, (2, 2) has the minimum x+y=4. The UE therefore selects (2, 2) for the CSI reporting. In yet another example, the UE is configured with one (x, y) combination out of multiple (x, y) combinations via higher layer RRC signaling.

In some embodiments, a UE is configured with three PUCCH Formats, x, y, and z. In one example, the UE is configured with a PUCCH Format x to report a subset $S_1$ of all CSI components S in subframe or CSI reporting instance A0 (or subframes A0, A1, . . . ). In another example, the UE is configured with a PUCCH Format y to report another subset $S_2$ of all CSI components S in subframe or CSI reporting instance B0 (or subframes B0, B1, . . . ). In yet another example, the UE is configured with a PUCCH Format z to report another subset $S_3$ of all CSI components S in subframe or CSI reporting instance C0 (or subframes C0, C1, . . . ). In such examples, x, y, and z belonging to {1a, 1b, 2, 2a, 2b, 3, 4, 5, new format numbers} may or may not be the same. In such example, $S_1$, $S_2$, and $S_3$ may or may not have a common component, and the union of $S_1$, $S_2$, and $S_3$ may or may not equal S. In such example, A0, A1, . . . , B0, B1, . . . , and C0, C1, . . . are all different subframes.

Examples of CSI reporting in three sets $S_1$, $S_2$, and $S_3$ on PUCCH Format x, y, and z respectively are shown in TABLE 11.

TABLE 11

| Example | First CSI subset: $S_1$ reported using PUCCH Format x in subframe A0 or subframes (A0, A1, . . . ) | Second CSI subset: $S_2$ reported on PUCCH Format y in subframe B0 or subframes (B0, B1, . . . ) | Third CSI subset: $S_3$ reported on PUCCH Format z in subframe C0 or subframes (C0, C1, . . . ) |
|---|---|---|---|
| 1 | RI | $i_1$ or $(i_{1,1}, i_{1,2})$ | $i_2$, CQI |
| 2 | CRI | RI | PMI, CQI |
| 3 | CRI, RI | $i_1$ or $(i_{1,1}, i_{1,2})$ | $i_2$, CQI |

Three CSI components or reports, $S_1$, $S_2$, and $S_3$, are configured to be reported on PUCCH Formats, x, y, and z, respectively, where the supported combinations of PUCCH formats includes a set of PUCCH Format 1, Format 1, and Format 2, a set of PUCCH Format 1, Format 2, and Format 2, a set of PUCCH Format 1, Format 2, and Format 3, a set of PUCCH Format 1, Format 3, and Format 3, a set of PUCCH Format 2, Format 2, and Format 2, a set of PUCCH Format 2, Format 2, and Format 3, as et of PUCCH Format 2, Format 3, and Format 3, and a set of PUCCH Format 3, Format 3, and Format 3.

Figure 20:
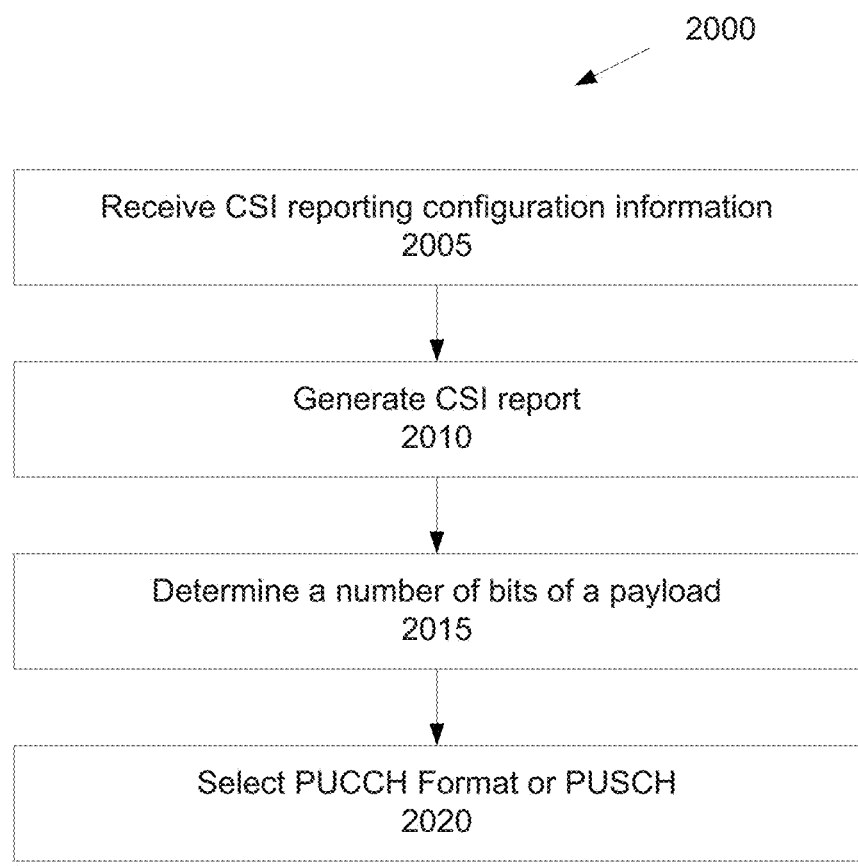
FIG. 20 illustrates a flowchart of a CSI reporting according to embodiments of the present disclosure.

FIG. 20 illustrates a flowchart of a CSI reporting 2000 according to embodiments of the present disclosure, as may be performed by a UE. An embodiment of the CSI reporting 2000 shown in FIG. 20 is for illustration only. Other embodiments may be used without departing from the scope of the present disclosure.

As shown in FIG. 20, the UE begins operation at block 2005. At block 2005, the UE receives CSI reporting configuration information from an eNB. At block 2010, the UE generates a CSI report comprising at least one of an RI, a CQI, a PMI, or a CRI based on the CSI reporting configuration information received from the eNB. The UE further determines a number of bits of a payload included in the CSI report at block 2015. At block 2020, the UE finally selects at least one of a PUCCH Format or a PUSCH based on the number of bits of the payload included in the CSI report to transmit the CSI report to the eNB.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) reporting in a wireless communication system, the UE comprising:
    a transceiver configured to receive CSI reporting configuration information; and
    at least one processor operably connected to the transceiver, the at least one processor configured to:
        generate a CSI report comprising a precoding matrix indicator (PMI) and a CSI-RS resource indicator (CRI) based on the CSI reporting configuration information;
        determine a CSI report set comprising a first subset and a second subset based on the CSI reporting configuration information that is used for the CSI report;
        determine a number of bits of a payload included in the CSI report for the first subset and the second subset included in the CSI report set; and
    if the payload is greater than an allowable number of bits, select a first uplink (UL) channel as a first physical uplink control channel (PUCCH) format for the first subset and select a second UL channel as a second PUCCH format for the second subset to transmit the CSI report,
    wherein the first subset includes at least a first part of the PMI and the second subset includes at least a second part of the PMI, and
    wherein the transceiver is further configured to transmit the first and second subset using the selected UL channels.

2. The UE of claim 1, wherein the first UL channel comprises a PUCCH format 2 and the second UL channel comprises a PUCCH format 3.

3. The UE of claim 1, wherein the allowable number of bits corresponds to a maximum number of bits included in the PUCCH format 1.

4. The UE of claim 1, wherein, to transmit the first and second subset using the selected UL channels, the transceiver is further configured to:
    transmit the first UL channel comprising the first subset or the second subset included in the CSI report set that includes the CRI, if the number of bits of the payload included in the CSI report is smaller than or equal to the allowable number of bits, wherein the first UL channel comprises the PUCCH format 1; and transmit the second UL channel comprising the first subset or the second subset included in the CSI report set that includes the CRI, if the number of bits of the payload included in the CSI report is greater than the allowable number of bits, wherein the second UL channel comprises the PUCCH format 2.

5. The UE of claim 1, wherein each of the first subset and the second subset included in the CSI report set is configured to be reported using either a same PUCCH Format including at least one of a PUCCH format 2 or PUCCH Format 3, or a different PUCCH Format including at least one of the PUCCH format 2 or the PUCCH Format 3.

6. The UE of claim 1, wherein each of the first subset and the second subset included in the CSI report set comprises different CSI reports in accordance with the number of bits of the payload included in the CSI report.

7. The UE of claim 1, wherein each of the first subset and the second subset included in the CSI report set is transmitted over different subframes, each of the different subframes comprising at least one subframe.

8. The UE of claim 1, wherein:
the at least one processor is further configured to:
map the first subset to a first enhanced multi-input-multi-output (eMIMO)-Type and the second subset to a second eMIMO-Type; and
the transceiver is further configured to report each of the first subset associated with the first eMIMO-Type and the second subset associated with the second eMIMO-Type using a PUCCH format 2 if the payload is smaller than or equal to the allowable number of bits or a PUCCH format 3 if the payload is greater than the allowable number of bits.

9. The UE of claim 1, wherein the first UL channel comprises the PUCCH format 1 and the second UL channel comprises a PUSCH format 2.

10. An eNodeB (eNB) for channel state information (CSI) reporting in a wireless communication system, the eNB comprising:
a transceiver configured to:
transmit CSI reporting configuration information; and
receive, from a user equipment (UE), a CSI report including a precoding matrix indicator (PMI) and a CSI resource indicator (CRI) based on the CSI reporting configuration information, wherein the CSI report comprises a CSI report set that includes a first subset and a second subset determined based on the transmitted CSI reporting configuration information; and
at least one processor operably connected to the transceiver, the at least one processor configured to determine a number of bits of a payload included in the CSI report for the first subset and the second subset included in the CSI report set,
wherein,
if the payload is greater than an allowable number of bits, the CSI report is received on a first uplink (UL) channel as a first physical uplink control channel (PUCCH) format for the first subset and a second UL channel as a second PUCCH format for the second subset,
wherein the first subset includes at least a first part of the PMI and the second subset includes at least a second part of the PMI.

11. The eNB of claim 10, wherein the first UL channel comprises a PUCCH format 2 and the second UL channel comprises a PUCCH format 3, and wherein the allowable number of bits corresponds to a maximum number of bits included in the PUCCH.

12. The eNB of claim 10, wherein the transceiver is further configured to:
receive the first UL channel comprising the first subset or the second subset included in the CSI report set that includes the CRI, if the number of bits of the payload include in the CSI report is smaller than or equal to the allowable number of bits, wherein the first UL channel comprises the PUCCH format 1; and
receive the second UL channel comprising the first subset or the second subset included in the CSI report set that includes the CRI, if the number of bits of the payload included in the CSI report is greater than the allowable number of bits, wherein the second UL channel comprises the PUCCH format 2.

13. The eNB of claim 10, wherein:
the transceiver is further configured to receive each of a first subset associated with a first enhanced multi-input-multi-output (eMIMO)-Type and a second subset associated with a second eMIMO-Type using a PUCCH format 2 if the payload is smaller than or equal to the allowable number of bits, or a PUCCH format 3 if the payload is greater than the allowable number of bits respectively; and
the at least one processor is further configured to
map the first subset to the first eMIMO-Type and the second subset to the second eMIMO-Type.

14. The eNB of claim 10, wherein the first UL channel comprises the PUCCH format 1 and the second UL channel comprises a PUSCH format 2.

15. A method of a user equipment (UE) for channel state information (CSI) reporting in a wireless communication system, the method comprising:
receiving CSI reporting configuration information;
generating a CSI report comprising a precoding matrix indicator (PMI) and a CSI-RS resource indicator (CRI) based on the CSI reporting configuration information;
determining a CSI report set comprising a first subset and a second subset based on the CSI reporting configuration information that is used for the CSI report;
determining a number of bits of a payload included in the CSI report for the first subset and the second subset included in the CSI report set;
if the payload is greater than an allowable number of bits, selecting a first uplink (UL) channel as a first physical uplink control channel (PUCCH) format for the first subset and selecting a second UL channel as a second PUCCH format for the second subset to transmit the CSI report, wherein the first subset includes at least a first part of the PMI and the second subset includes at least a second part of the PMI; and
transmitting the first and second subset using the selected UL channels.

16. The method of claim 15, wherein the first UL channel comprises a PUCCH format 2 and the second UL channel comprises a PUCCH format 3.

17. The method of claim 15, wherein the allowable number of bits corresponds to a maximum number of bits included in the PUCCH format 1.

18. The method of claim 15, wherein transmitting the first and second subset using the selected UL channels comprises:
transmitting the first UL channel comprising the first subset or the second subset included in the CSI report set that includes the CRI, if the number of bits of the payload included in the CSI report is smaller than or equal to the allowable number of bits, wherein the first UL channel comprises the PUCCH format 1; and transmitting the second UL channel comprising the first subset or the second subset included in the CSI report set that includes the CRI, if the number of bits of the payload included in the CSI report is greater than the allowable number of bits, wherein the second UL channel comprises a PUCCH format 2.

19. The method of claim 15, wherein the first UL channel comprises the PUCCH format 1 and the second UL channel comprises a PUSCH format 2.

* * * * *